United States Patent
Ding et al.

(10) Patent No.: US 11,321,830 B2
(45) Date of Patent: May 3, 2022

(54) IMAGE DETECTION METHOD AND APPARATUS AND TERMINAL

(71) Applicant: Huawei Technologies Co., Ltd., Shenzhen (CN)

(72) Inventors: Xin Ding, Beijing (CN); Chen Dong, Beijing (CN); Henghui Lu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 16 days.

(21) Appl. No.: 16/640,945

(22) PCT Filed: Aug. 24, 2017

(86) PCT No.: PCT/CN2017/098787
§ 371 (c)(1),
(2) Date: Feb. 21, 2020

(87) PCT Pub. No.: WO2019/037014
PCT Pub. Date: Feb. 28, 2019

(65) Prior Publication Data
US 2020/0380674 A1     Dec. 3, 2020

(51) Int. Cl.
*G06T 7/00* (2017.01)
(52) U.S. Cl.
CPC ........ *G06T 7/0012* (2013.01); *G06T 2200/24* (2013.01); *G06T 2207/10024* (2013.01);
(Continued)
(58) Field of Classification Search
CPC .............. G06T 7/0012; G06T 2200/24; G06T 2207/10024; G06T 2207/20221; G06T 2207/30041; G06T 2207/30088
See application file for complete search history.

(56) References Cited

U.S. PATENT DOCUMENTS

| 2010/0214421 A1 | 8/2010 | Qu et al. |
| 2010/0284610 A1 | 11/2010 | Yoshikawa |

(Continued)

FOREIGN PATENT DOCUMENTS

| CN | 101911118 A | 12/2010 |
| CN | 103002863 A | 3/2013 |

(Continued)

OTHER PUBLICATIONS

Marty O. Visscher et al: "Update on Techniques for the Quantitation of Facial Skin Characteristics", Facial plastic surgery clinics of North America, vol. 21, No. 1, Feb. 1, 2013 (Feb. 1, 2013), pp. 7-19, XP055706284 (Year: 2013).*

(Continued)

*Primary Examiner* — Leon Viet Q Nguyen
(74) *Attorney, Agent, or Firm* — Conley Rose, P.C.

(57) ABSTRACT

An image detection method includes determining, by a terminal in a skin detection mode, a to-be-detected original image in a raw format based on a to-be-detected feature, processing the to-be-detected original image according to a preset rule corresponding to the to-be-detected feature to obtain a detection-specific image, determining a normal image that is in a Joint Photographic Experts Group (JPEG) format, detecting the detection-specific image to determine a detection result image, and determining a to-be-displayed image based on the detection result image and the normal image.

20 Claims, 13 Drawing Sheets

(52) U.S. Cl.
CPC ............... *G06T 2207/20221* (2013.01); *G06T 2207/30041* (2013.01); *G06T 2207/30088* (2013.01)

(56) References Cited

U.S. PATENT DOCUMENTS

| | | | |
|---|---|---|---|
| 2011/0206254 A1* | 8/2011 | Patwardhan | A61B 5/0077 382/128 |
| 2013/0058543 A1* | 3/2013 | Thomas | G06K 9/6201 382/118 |
| 2013/0089245 A1* | 4/2013 | Yamazaki | G06K 9/00221 382/118 |
| 2015/0351682 A1* | 12/2015 | Yamanashi | G06T 7/0085 600/476 |
| 2015/0374277 A1 | 12/2015 | Patwardhan | |
| 2017/0004378 A1 | 1/2017 | Yu | |
| 2017/0119301 A1 | 5/2017 | Kimura | |
| 2018/0153422 A1* | 6/2018 | Watanabe | A61B 5/0059 |
| 2020/0065998 A1* | 2/2020 | Dissanayake | G06T 7/11 |

FOREIGN PATENT DOCUMENTS

| | | |
|---|---|---|
| CN | 103927718 A | 7/2014 |
| CN | 105787929 A | 7/2016 |
| CN | 106163384 A | 11/2016 |
| CN | 106327537 A | 1/2017 |
| CN | 106650215 A | 5/2017 |
| EP | 1158779 A2 | 11/2001 |
| EP | 2448548 B1 | 3/2017 |

OTHER PUBLICATIONS

Proceedings vol. 10497, Imaging, Manipulation, and Analysis of Biomolecules, Cells, and Tissues XVI; 104970N (2018) https://doi.org/10.1117/12.2292506 Event: SPIE BiOS, 2018, San Francisco, California, United States (Year: 2018).*

Demirli, R., et al.,"RBX Technology Overview," XP055000991, Jan. 1, 2007, 6 pages.

Visscher, et al., "Update on Techniques for the Quantitation of Facial Skin Characteristics," XP055706284, Facial plastic surgery clinics of North America 21(1), Feb. 2013, 14 pages.

* cited by examiner

IMAGE DETECTION METHOD AND APPARATUS AND TERMINAL

CROSS-REFERENCE TO RELATED APPLICATIONS

This application is a U.S. National Stage of International Patent Application No. PCT/CN2017/098787 filed on Aug. 24, 2017, which is hereby incorporated by reference in its entirety.

TECHNICAL FIELD

Embodiments of the present invention relate to the field of multimedia technologies, and in particular, to an image detection method and apparatus and a terminal.

BACKGROUND

Everyone loves beauty. With steady improvement of the living standard, people are more willing to pursue beauty. Skin health is a focus of people who pursue beauty and advocate beauty. Skin health detection refers to overall evaluation on a skin condition, and includes detection and evaluation on skin quality, a skin color, a wrinkle, a stain, a red zone, acne, a pore, a dark under-eye circle, under-eye puffiness, and the like. According to these evaluation results, people can accordingly take skin care measures, to keep skin healthy and beautiful.

Conventional skin health detection is usually performed by professional personnel in a hospital or a beauty salon by using a professional device. Although this manner is accurate and professional, this manner lacks convenience and real-time quality, and is expensive. Some handheld detection devices have emerged in the current market, but the handheld detection devices are inconvenient, unpopular, and expensive. Therefore, skin health detection based on a terminal (for example, a mobile phone or a computer) may provide a convenient and professional service for a user. The user needs only to simply take a photo, to learn of a current skin condition of the user, and obtain a corresponding care suggestion.

A skin health detection method includes: detecting a skin based on an image or by using a sensor. However, in the detection method based on the image, because imaging quality of an existing photographing technology is greatly different from that of a photo used in a professional skin detection device, definition of a facial skin detail feature usually cannot meet a detection precision requirement. Consequently, the suggestion obtained by the user is not accurate enough.

SUMMARY

Embodiments of the present invention provide an image detection method and apparatus and a terminal, to resolve problems that imaging quality does not meet a requirement for detection precision of skin health detection, and convenient, accurate, and professional skin health detection and evaluation cannot be provided for a user anywhere and anytime.

According to a first aspect, an embodiment of the present invention provides an image detection method. The method specifically includes: determining, by a terminal in a skin detection mode, a to-be-detected original image based on a to-be-detected feature; processing, by the terminal, the to-be-detected original image according to a preset rule corresponding to the to-be-detected feature, to obtain a detection-specific image; determining, by the terminal, a normal image; and determining, by the terminal, a to-be-displayed image based on a detection result image and the normal image.

In this solution, a to-be-detected original file is processed and detected in the skin detection mode, to obtain the detection-specific image, the detection result image is determined based on the detection-specific image, and then the detection result image and the normal image are processed, to obtain the to-be-displayed image. This resolves problems that imaging quality does not meet a requirement for detection precision of health detection, and convenient, accurate, and professional skin health detection and evaluation cannot be provided for a user anywhere and anytime.

In an optional implementation, the to-be-detected feature includes at least one of a skin color, a stain, a red zone, acne, grease, a wrinkle, an eye feature, and a pore. The eye feature may include at least one of under-eye puffiness, a dark under-eye circle, and an eye fine line.

In another optional implementation, the to-be-detected original image includes at least one of a color to-be-detected original image and a monochrome to-be-detected original image.

In still another optional implementation, the foregoing method of "determining, by a terminal in a skin detection mode, a to-be-detected original image based on a to-be-detected feature" may include: when the to-be-detected feature includes at least one of the skin color, the stain, the red zone, and the acne, determining that the to-be-detected original image is the color to-be-detected original image; or when the to-be-detected feature includes at least one of the grease, the wrinkle, the eye feature, and the pore, determining that the to-be-detected original image is the monochrome to-be-detected original image.

Because the to-be-detected feature has different types, in an optional implementation, different to-be-detected original images may be provided for characteristics of the types of the to-be-detected features, to provide an original image that is unprocessed and that has relatively high precision for subsequent processing. This ensures high precision of the to-be-detected original image.

In yet another optional implementation, the foregoing method of "determining, by the terminal, a normal image" may include: fusing, by the terminal, at least two sub-images of the normal image. The at least two sub-images include at least one of a color normal sub-image and a monochrome normal sub-image.

In yet another optional implementation, the foregoing method of "processing, by the terminal, the to-be-detected original image according to a preset rule corresponding to the to-be-detected feature, to obtain a detection-specific image" may include:

when the to-be-detected feature is a skin color, a preset rule corresponding to the skin color includes at least one sub-rule in illumination equalization, white balance adjustment, and image smoothing;

when the to-be-detected feature is at least one of a stain and a red zone, a preset rule corresponding to the at least one of the stain and the red zone includes at least one sub-rule in contrast transfer, image sharpening, and red brown X (red brown X. RBX) color space transformation;

when the to-be-detected feature is acne, a preset rule corresponding to the acne includes at least one sub-rule in contrast transfer, image sharpening, and a hue-saturation-value (hue-saturation-value, HSV) space image;

when the to-be-detected feature is grease, a preset rule corresponding to the grease includes contrast transfer; or when the to-be-detected feature is at least one of an eye feature and a pore, a preset rule corresponding to the at least one of the eye feature and the pore includes at least one sub-rule in contrast transfer, illumination equalization, and image sharpening.

In yet another optional implementation, an adjustment amplitude of the white balance adjustment is a preset value, and transformation space of the RBX color space transformation and transformation space of the HSV space image are preset values.

Based on different to-be-detected features, different preset rules are provided for processing. For example, skin noise can be reduced after processing is performed according to the preset rule corresponding to the skin color. After processing is performed according to the preset rule corresponding to the at least one of the stain and the red zone, a contrast and an image sharpening degree may be increased to preset values, then the stain is highlighted by using a B channel (brown channel) in RBX space, and the red zone may be highlighted by using an R channel (red channel). After processing is performed according to the preset rule corresponding to the acne, a contrast and an image sharpening degree may be increased to preset values, and then an acne feature is highlighted by using the HSV space image. After processing is performed according to the preset rule corresponding to the grease, grease detection may be completed based on a light reflection part of a skin, a contrast is increased to a preset value to further highlight the light reflection part, and the grease is detected based on the reflection part. After processing is performed according to the preset rule corresponding to the at least one of the eye feature and the pore, a contrast and an image sharpening degree may be increased to highlight a feature region.

In yet another optional implementation, the foregoing method of "determining, by the terminal, a to-be-displayed image based on a detection result image and the normal image" may include: processing, by the terminal, the detection result image and the normal image by using an image matching method and an image fusion method, to determine the to-be-displayed image.

In yet another optional implementation, the terminal displays a detection feature option in the skin detection mode, and determines the to-be-detected feature based on selection of a user. In an actual operation of the user, to-be-detected features in skin regions in some to-be-detected original images do not need to be detected. Therefore, in this implementation, the option may be further provided for the user. The terminal displays the detection feature option in the skin detection mode, and the user may independently perform selection. This improves user experience.

In yet another optional implementation, the terminal displays the to-be-displayed image.

In yet another optional implementation, the foregoing method of "determining, by a terminal in a skin detection mode, a to-be-detected original image based on a to-be-detected feature" may include: determining, by the terminal in the skin detection mode based on the to-be-detected feature, a camera that shoots the to-be-detected original image. The camera includes at least one of a color camera and a monochrome camera.

In yet another optional implementation, the foregoing method of "determining, by the terminal in the skin detection mode based on the to-be-detected feature, a camera that shoots the to-be-detected original image" may include: if the to-be-detected feature includes at least one of the skin color, the stain, the red zone, and the acne, determining, by the terminal in the skin detection mode, that the camera that shoots the to-be-detected original image is the color camera; or if the to-be-detected feature includes at least one of the grease, the wrinkle, the eye feature, and the pore, determining, by the terminal in the skin detection mode, that the camera that shoots the to-be-detected original image is the monochrome camera.

To obtain a clearer detection-specific image, to-be-detected features may be classified in the method. The skin color, the stain, the red zone, and the acne may be classified into one group, and the grease, the wrinkle, the eye feature, and the pore may be classified into one group. An appropriate camera is selected based on a combination of to-be-detected features, and a to-be-detected original image (namely, an image that is unprocessed and that is in a RAW format) more suitable for the to-be-detected feature is shot by using the selected camera. The camera may be invoked in the skin detection mode, the shooting mode may be selected, and a to-be-detected feature in the shooting mode may be selected by the user. This is not limited herein. When the user selects no to-be-detected feature, the terminal automatically detects all to-be-detected features by default. Therefore, the camera determined by the terminal may alternatively be a dual-lens camera. The dual-lens camera may include a color camera and a monochrome camera.

According to a second aspect, an embodiment of the present invention provides an image detection apparatus. The apparatus includes: a first determining unit, configured to determine, in a skin detection mode, a to-be-detected original image based on a to-be-detected feature; a second determining unit, configured to: process the to-be-detected original image according to a preset rule corresponding to the to-be-detected feature to obtain a detection-specific image, and determine a normal image; a detection unit, configured to detect the detection-specific image, to determine a detection result image; and a matching unit, configured to determine a to-be-displayed image based on the detection result image and the normal image.

In this solution, the first determining unit processes and detects a to-be-detected original file in the skin detection mode, to obtain the detection-specific image, the second determining unit determines the detection result image based on the detection-specific image, and then the detection result image and the normal image are processed, to obtain the to-be-displayed image. This resolves problems that imaging quality does not meet a requirement for detection precision of health detection, and convenient, accurate, and professional skin health detection and evaluation cannot be provided for a user anywhere and anytime.

In an optional implementation, the to-be-detected feature includes at least one of a skin color, a stain, a red zone, acne, grease, a wrinkle, an eye feature, and a pore. The eye feature may include at least one of under-eye puffiness, a dark under-eye circle, and an eye fine line.

In another optional implementation, the to-be-detected original image includes at least one of a color to-be-detected original image and a monochrome to-be-detected original image.

In still another optional implementation, when the to-be-detected feature includes at least one of the skin color, the stain, the red zone, and the acne, the to-be-detected original image is the color to-be-detected original image; or when the to-be-detected feature includes at least one of the grease, the wrinkle, the eye feature, and the pore, the to-be-detected original image is the monochrome to-be-detected original image.

Because the to-be-detected feature has different types, in an optional implementation, different to-be-detected original images may be provided for characteristics of the types of the to-be-detected features, to provide an original image that is unprocessed and that has relatively high precision for subsequent processing. This ensures high precision of the to-be-detected original image.

In yet another optional implementation, the "second determining unit" may be configured to fuse at least two sub-images of the normal image. The at least two sub-images include at least one of a color normal sub-image and a monochrome normal sub-image. In yet another optional implementation, a preset rule corresponding to the skin color includes:

when the to-be-detected feature is a skin color, a preset rule corresponding to the skin color includes at least one sub-rule in illumination equalization, white balance adjustment, and image smoothing;

when the to-be-detected feature is at least one of a stain and a red zone, a preset rule corresponding to the at least one of the stain and the red zone includes at least one sub-rule in contrast transfer, image sharpening, and RBX color space transformation;

when the to-be-detected feature is acne, a preset rule corresponding to the acne includes at least one sub-rule in contrast transfer, image sharpening, and an MAI space image;

when the to-be-detected feature is grease, a preset rule corresponding to the grease includes contrast transfer; or when the to-be-detected feature is at least one of an eye feature and a pore, a preset rule corresponding to the at least one of the eye feature and the pore includes at least one sub-rule in contrast transfer, illumination equalization, and image sharpening.

In yet another optional implementation, an adjustment amplitude of the "white balance adjustment" is a preset value, and transformation space of the RBX color space transformation and transformation space of the HSV space image are preset values.

In yet another optional implementation, the "matching unit" is further configured to process the detection result image and the normal image by using an image matching method and an image fusion method, to determine the to-be-displayed image.

In yet another optional implementation, the "first determining module" is further configured to: display a detection feature option in the skin detection mode, and determine the to-be-detected feature based on selection of a user.

In yet another optional implementation, the apparatus further includes a display module, configured to display the to-be-displayed image.

In yet another optional implementation, the "first determining unit" may be further configured to: determine, in the skin detection mode, the to-be-detected feature based on the to-be-detected feature; and determine, in the skin detection mode based on the to-be-detected feature, a camera that shoots the to-be-detected original image. The camera includes at least one of a color camera and a monochrome camera.

Based on different to-be-detected features, different preset rules are provided for processing. For example, skin noise can be reduced after processing is performed according to the preset rule corresponding to the skin color. After processing is performed according to the preset rule corresponding to the at least one of the stain and the red zone, a contrast and an image sharpening degree may be increased to preset values, then the stain is highlighted by using a B channel (brown channel) in RBX space, and the red zone may be highlighted by using an R channel (red channel). After processing is performed according to the preset rule corresponding to the acne, a contrast and an image sharpening degree may be increased to preset values, and then an acne feature is highlighted by using the FEW space image. After processing is performed according to the preset rule corresponding to the grease, grease detection may be completed based on a light reflection part of a skin, a contrast is increased to a preset value to further highlight the light reflection part, and the grease is detected based on the reflection part. After processing is performed according to the preset rule corresponding to the at least one of the eye feature and the pore, a contrast and an image sharpening degree may be increased to highlight a feature region.

In yet another optional implementation, if the to-be-detected feature includes at least one of the skin color, the stain, the red zone, and the acne, it is determined, in the skin detection mode, that the camera that shoots the to-be-detected original image is the color camera; or if the to-be-detected feature includes at least one of the grease, the wrinkle, the eye feature, and the pore, it is determined, in the skin detection mode, that the camera that shoots the to-be-detected original image is the monochrome camera.

According to a third aspect, an embodiment of the present invention provides a terminal. The terminal includes a processor, configured to determine, in a skin detection mode, a to-be-detected original image based on a to-be-detected feature. The processor is further configured to: process the to-be-detected original image according to a preset rule corresponding to the to-be-detected feature to obtain a detection-specific image, and determine a normal image. The processor is further configured to detect the detection-specific image, to determine a detection result image. The processor is further configured to determine a to-be-displayed image based on the detection result image and the normal image.

In this solution, the processor processes and detects a to-be-detected original file in the skin detection mode to obtain the detection-specific image, and the processor may further determine the detection result image based on the detection-specific image, and then processes the detection result image and the normal image, to obtain the to-be-displayed image. This resolves problems that imaging quality does not meet a requirement for detection precision of health detection, and convenient, accurate, and professional skin health detection and evaluation cannot be provided for a user anywhere and anytime.

In an optional implementation, the to-be-detected feature includes at least one of a skin color, a stain, a red zone, acne, grease, a wrinkle, an eye feature, and a pore. The eye feature may include at least one of under-eye puffiness, a dark under-eye circle, and an eye fine line.

In another optional implementation, the to-be-detected original image includes at least one of a color to-be-detected original image and a monochrome to-be-detected original image.

In still another optional implementation, when the to-be-detected feature includes at least one of the skin color, the stain, the red zone, and the acne, the to-be-detected original image is the color to-be-detected original image; or when the to-be-detected feature includes at least one of the grease, the wrinkle, the eye feature, and the pore, the to-be-detected original image is the monochrome to-be-detected original image. Because the to-be-detected feature has different types, in an optional implementation, different to-be-detected original images may be provided for characteristics of the types of the to-be-detected features, to provide an original image that is unprocessed and that has relatively high precision for subsequent processing. This ensures high precision of the to-be-detected original image.

In yet another optional implementation, the "processor" may be configured to fuse at least two sub-images of the normal image. The at least two sub-images include at least one of a color normal sub-image and a monochrome normal sub-image. In yet another optional implementation, when the to-be-detected feature is a skin color, a preset rule corresponding to the skin color includes at least one sub-rule in illumination equalization, white balance adjustment, and image smoothing;

when the to-be-detected feature is at least one of a stain and a red zone, a preset rule corresponding to the at least one of the stain and the red zone includes at least one sub-rule in contrast transfer, image sharpening, and RBX color space transformation;

when the to-be-detected feature is acne, a preset rule corresponding to the acne includes at least one sub-rule in contrast transfer, image sharpening, and an HSV space image;

when the to-be-detected feature is grease, a preset rule corresponding to the grease includes contrast transfer; or when the to-be-detected feature is at least one of an eye feature and a pore, a preset rule corresponding to the at least one of the eye feature and the pore includes at least one sub-rule in contrast transfer, illumination equalization, and image sharpening.

In yet another optional implementation, an adjustment amplitude of the "white balance adjustment" is a preset value, and transformation space of the RBX color space transformation and transformation space of the HSV space image are preset values.

In yet another optional implementation, the "processor" may be further configured to process the detection result image and the normal image by using an image matching method and an image fusion method, to determine the to-be-displayed image.

In yet another optional implementation, the "processor" is further configured to: display a detection feature option in the skin detection mode, and determine the to-be-detected feature based on selection of a user.

In yet another optional implementation, the terminal further includes a display, configured to display the to-be-displayed image.

In yet another optional implementation, the "processor" may be further configured to: determine the to-be-detected feature in the skin detection mode; and determine, in the skin detection mode based on the to-be-detected feature, a camera that shoots the to-be-detected original image. The camera includes at least one of a color camera and a monochrome camera.

Based on different to-be-detected features, different preset rules are provided for processing. For example, skin noise can be reduced after processing is performed according to the preset rule corresponding to the skin color. After processing is performed according to the preset rule corresponding to the at least one of the stain and the red zone, a contrast and an image sharpening degree may be increased to preset values, then the stain is highlighted by using a B channel (brown channel) in RBX space, and the red zone may be highlighted by using an R channel (red channel). After processing is performed according to the preset rule corresponding to the acne, a contrast and an image sharpening degree may be increased to preset values, and then an acne feature is highlighted by using the HSV space image.

After processing is performed according to the preset rifle corresponding to the grease, grease detection may be completed based on a light reflection part of a skin, a contrast is increased to a preset value to further highlight the light reflection part, and the grease is detected based on the reflection part. After processing is performed according to the preset rule corresponding to the at least one of the eye feature and the pore, a contrast and an image sharpening degree may be increased to highlight a feature region.

In yet another optional implementation, if the to-be-detected feature includes at least one of the skin color, the stain, the red zone, and the acne, the processor determines, in the skin detection mode, that the camera that shoots the to-be-detected original image is the color camera; or if the to-be-detected feature includes at least one of the grease, the wrinkle, the eye feature, and the pore, the processor determines, in the skin detection mode, that the camera that shoots the to-be-detected original image is the monochrome camera.

In yet another optional implementation, the "processor" includes an image signal processor and a central processing unit. The image signal processor is configured to: determine, in the skin detection mode, the to-be-detected original image based on the to-be-detected feature; process the to-be-detected original image according to the preset rule corresponding to the to-be-detected feature, to obtain the detection-specific image; and determine the normal image.

The central processing unit is configured to: detect the detection-specific image, to determine the detection result image; and determine the to-be-displayed image based on the detection result image and the normal image.

According to a fourth aspect, an embodiment of this application provides a computer-readable storage medium, including a computer-readable instruction. When a computer reads and executes the computer-readable instruction, the computer is enabled to perform the method in the first aspect and the optional implementations of the first aspect.

According to a fifth aspect, an embodiment of this application provides a computer program product, including a computer-readable instruction. When a computer reads and executes the computer-readable instruction, the computer is enabled to perform the method in the first aspect and the optional implementations of the first aspect.

BRIEF DESCRIPTION OF DRAWINGS

The following describes embodiments of this application in more details with reference to accompanying drawings.

FIG. 4 (b) is an image in a JPEG format according to an embodiment of the present invention;

FIG. 5 (b) is a diagram of another mode selection interface according to an embodiment of the present invention;

FIG. 6 (*b*) is a schematic diagram of a detection-specific image including acne according to an embodiment of the present invention;

FIG. 7 (*b*) is a schematic diagram of an image including a normal amount of grease according to an embodiment of the present invention;

DESCRIPTION OF EMBODIMENTS

To facilitate understanding of the embodiments of the present invention, the following further describes specific embodiments with reference to the accompanying drawings. The embodiments are not intended to limit the embodiments of the present invention.

The embodiments of the present invention provide an image detection method and apparatus and a terminal. A to-be-detected original file is processed and detected in a skin detection mode, to obtain a detection result image, and then the detection result image and a normal image are matched and fused, to obtain a to-be-displayed image. This resolves a problem that imaging quality does not meet a requirement for detection precision of health detection. Therefore, this solution improves imaging quality and makes a detection result more accurate.

Figure 1:
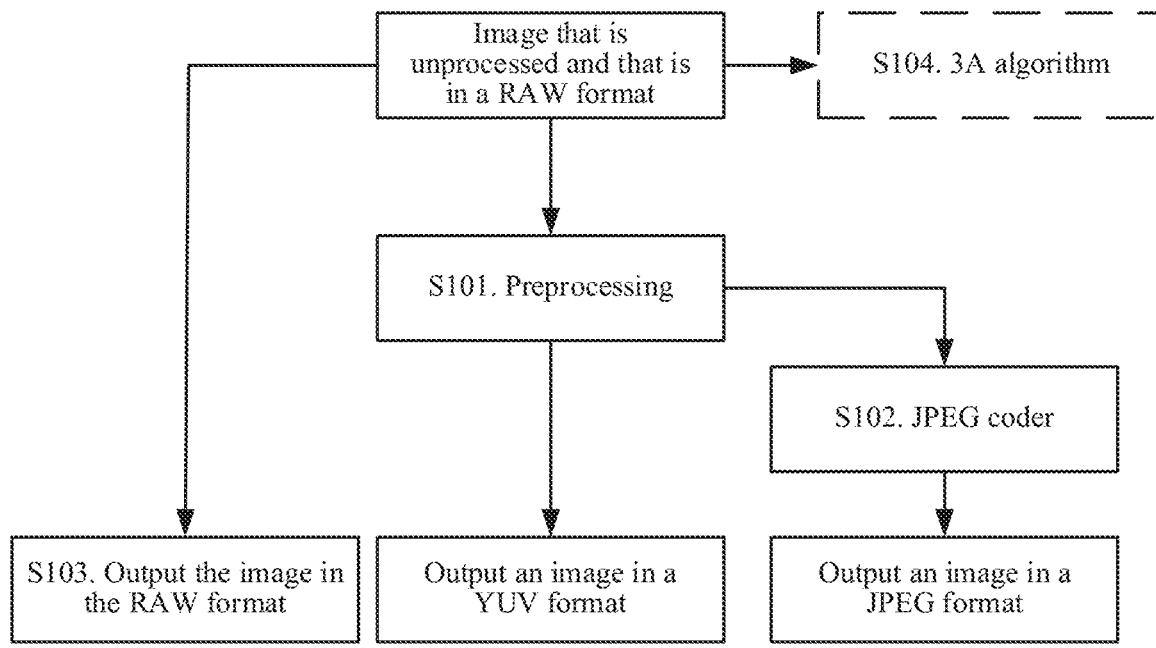
FIG. 1 is a flowchart of a method for processing an image by an image signal processor.

FIG. 1 is a flowchart of a method for processing an image by an image signal processor. As shown in FIG. 1, the image signal processor (internet service provider, ISP) performs the following processing on an image that is unprocessed and that is in a RAW format. The image signal processor may be disposed in a terminal.

S101. The ISP receives the image, namely, a to-be-detected original image in the following, that is unprocessed and that is in the RAW format, and performs preprocessing. A processing process is as follows: Hot pixel correction (hot pixel correction), demosaicing (demoscal), noise reduction (noise reduction), image shading correction (shading correction), geometric correction (geometric correction), color correction (color correction), tone curve adjustment (tone curve adjustment), and edge enhancement (edge enhancement) are performed on the to-be-detected original image that is in the RAW format, to obtain and output at least one image in a YUV formal.

S102. The ISP sends the preprocessed image to a JPEG coder, and the JPEG coder compresses the preprocessed image and outputs an image in a JPEG format. In the prior art, the JPEG image obtained by using the method for processing the unprocessed image cannot meet a precision requirement of subsequent skin feature detection. Specifically, first, in S102, lossy compression is performed on the image that is unprocessed and that is in the RAW format, to obtain the image in the JPEG format. Some skin detail features are not obvious after the compression performed by the JPEG coder, and consequently it is more difficult to subsequently detect the image in the JPEG format, resulting in an inaccurate result. Second, after S101 and S102, only 8-bit (bit) color information is reserved for each pixel of the JPEG image. However, color information in the RAW format is 10 to 16 bits (bit). It can be learned that, a color level of the JPEG image is greatly reduced, and an adjustable range of a contrast, light, or the like is correspondingly reduced subsequently, resulting in an inaccurate result Third, a white balance adjustment range of the JPEG image obtained after processing by using this method is limited, and detail information is usually lost in color temperature adjustment, resulting in an inaccurate subsequent result.

S103. Alternatively, the ISP may directly output the image that is unprocessed and that is in the RAW format.

S104. Perform a 3A algorithm. Specifically, a 3A technology is autofocus (AF), automatic exposure (AE), and automatic white balance (AWB). In a 3A digital imaging technology, an AF autofocus algorithm, an AE automatic exposure algorithm, and an AWB automatic white balance algorithm are used to maximize a contrast of the image in the RAW format, avoid overexposure or underexposure of a main photographed object, and compensate for a color difference of the image in different light, so as to present image information with relatively high image quality. A camera that uses the 3A digital imaging technology can well ensure precise color restoration of the image, and present a perfect day and night monitoring effect.

Figure 2:
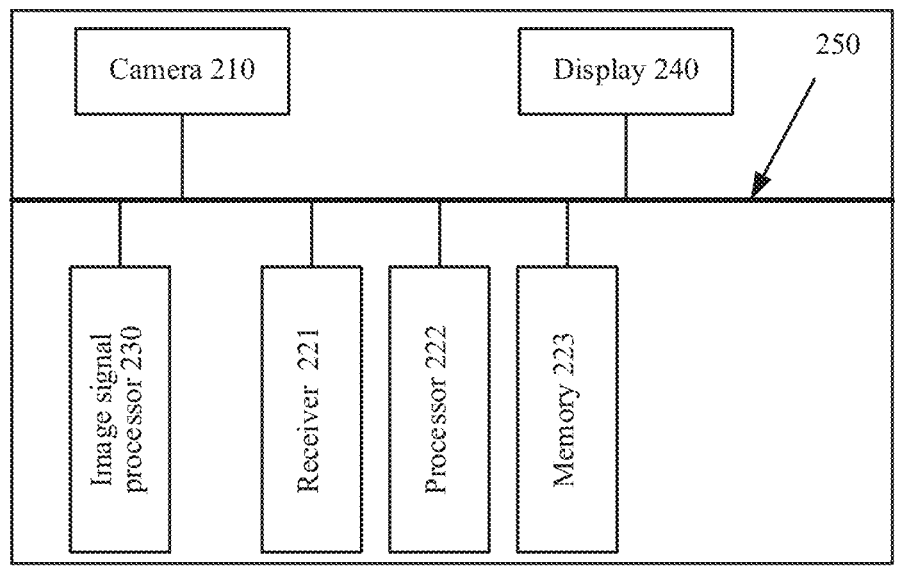
FIG. 2 is a schematic structural diagram of an image detection terminal according to an embodiment of the present invention.

FIG. 2 is a schematic structural diagram of an image detection terminal according to an embodiment of the present invention. As shown in FIG. 2, the terminal may include a mobile phone, a tablet computer, a notebook computer, a personal digital assistant (personal digital assistant, FDA), a point of sale (point of sales, POS) terminal, an in-vehicle computer, and the like. The terminal may include at least a camera 210, a processing apparatus, an image signal processor 230, a display 240, and a communications bus 250. The camera 210, the processing apparatus, the image signal processor (image signal processor, ISP) 230, and the display 240 are connected to each other and communicate with each other by using the communications bus 250.

The camera 210 is configured to shoot an image. The image includes a normal image and an image that is unprocessed and that is in a RAW format (namely, a to-be-detected original image in the following). It should be noted that the camera may be a single-lens camera, or may be a dual-lens camera. The dual-lens camera may include a color camera and a monochrome camera.

The processing apparatus may include a receiver 221, a processor 222, and a memory 223. The receiver 221 is configured to receive the normal image and a detection-specific image. The memory 223 is configured to store the detection-specific image.

The image signal processor 230 is configured to: invoke an operation instruction, receive the image that is unprocessed and that is in the RAW format, namely, the original image shot by the camera 210, and perform the following operations:

determining, in a skin detection mode, a to-be-detected original image based on a to-be-detected feature;

processing the to-be-detected original image according to a preset rule corresponding to the to-be-detected feature, to obtain the detection-specific image;

determining the normal image;

detecting the detection-specific image, to determine a detection result image; and determining a to-be-displayed image based on the detection result image and the normal image.

It should be noted that the method may be processed in the image signal processor 230. Alternatively, the method may be separately processed in the image signal processor 230 and the processing apparatus. For example, the steps of "determining, in a skin detection mode, a to-be-detected original image based on a to-be-detected feature; processing the to-be-detected original image according to a preset rule corresponding to the to-be-detected feature, to obtain the detection-specific image; and determining the normal image" are processed in the image signal processor 230. Then, the steps of "detecting the detection-specific image, to determine a detection result image; and determining a to-be-displayed image based on the detection result image and the normal image" are processed in the processing apparatus.

It should be noted that the steps may be understood as a parallel method newly added to the image signal processor 230. In other words, a processor other than the image signal processor 230 is not used to process the step of obtaining the detection-specific image, and the process may be completed by the image signal processor 230. Usually, if the processor other than the image signal processor 230 is used for processing, after photographing and storage, the processor invokes the normal image and the detection-specific image that are stored in the memory 233 of the terminal, and then the processor processes the detection-specific image, to generate the detection result image. However, from a perspective of the technical solutions of the technology protected in this application, implementing the operations in the image signal processor 230 is a better solution due to the following reasons: If the operations are implemented in the image signal processor 230, the image in the RAW format does not need to be additionally stored, and occupation space is small. In addition, if the operations are implemented in the image signal processor 230, costs are low, a processing speed is high, and user experience is improved.

In the step of "determining the normal image", the normal image obtained in this step is generated together with the detection-specific image.

In this embodiment of the present invention, the image signal processor 230 may be further configured to determine the detection-specific image based on the to-be-detected original image and the to-be-detected feature. A determining process may include: performing at least one of illumination equalization, white balance adjustment, image smoothing, contrast transfer, image sharpening, or color space transformation on the to-be-detected original image, to determine the output detection-specific image.

The processing apparatus in the apparatus may further include the processor and the memory. The processor may be a central processing unit (central processing unit, CPU), or the processor may be another general-purpose processor, a digital signal processor (digital signal processing, DSP), an application-specific integrated circuit (application-specific integrated circuit, ASIC), a field-programmable gate array (field-programmable gate array, FPGA) or another programmable logic device, a discrete gate or a transistor logic device, a discrete hardware component, or the like. The general-purpose processor may be a microprocessor, or the processor may be any conventional processor or the like. The processor may further receive the detection-specific image and the normal image that are determined by the image signal processor 230, detect the detection-specific image, and determine the detection result image. The processor performs matching and fusion on the detection result image and the normal image, to determine the to-be-displayed image.

The memory may include a read-only memory and a random access memory. Specifically, the memory may store the detection-specific image, and provides an instruction and data for the image signal processor 230. A part of the memory may further include a non-volatile random access memory. For example, the memory may further store information about a device type.

The communications bus 250 may further include a power bus, a control bus, a status signal bus, and the like in addition to a data bus. However, for clear description, various types of buses are marked as the communications bus 250 in the figure.

In addition, the display 240 is configured to display the to-be-displayed image. Although not shown, the terminal may further include Bluetooth, an antenna, a microphone, and the like. Details are not described herein. A person skilled in the art may understand that a terminal structure shown in FIG. 2 does not constitute any limitation on the terminal, and the terminal may include more or fewer components than those shown in the figure, or combine some components, or have a different component arrangement.

To describe the following method embodiment in more detail, the method may be executed by the terminal shown in FIG. 2. For ease of description, a mobile phone is used as an example in the following embodiment, and detailed descriptions are provided in the embodiments with reference to FIG. 3 to FIG. 16.

Figure 3:
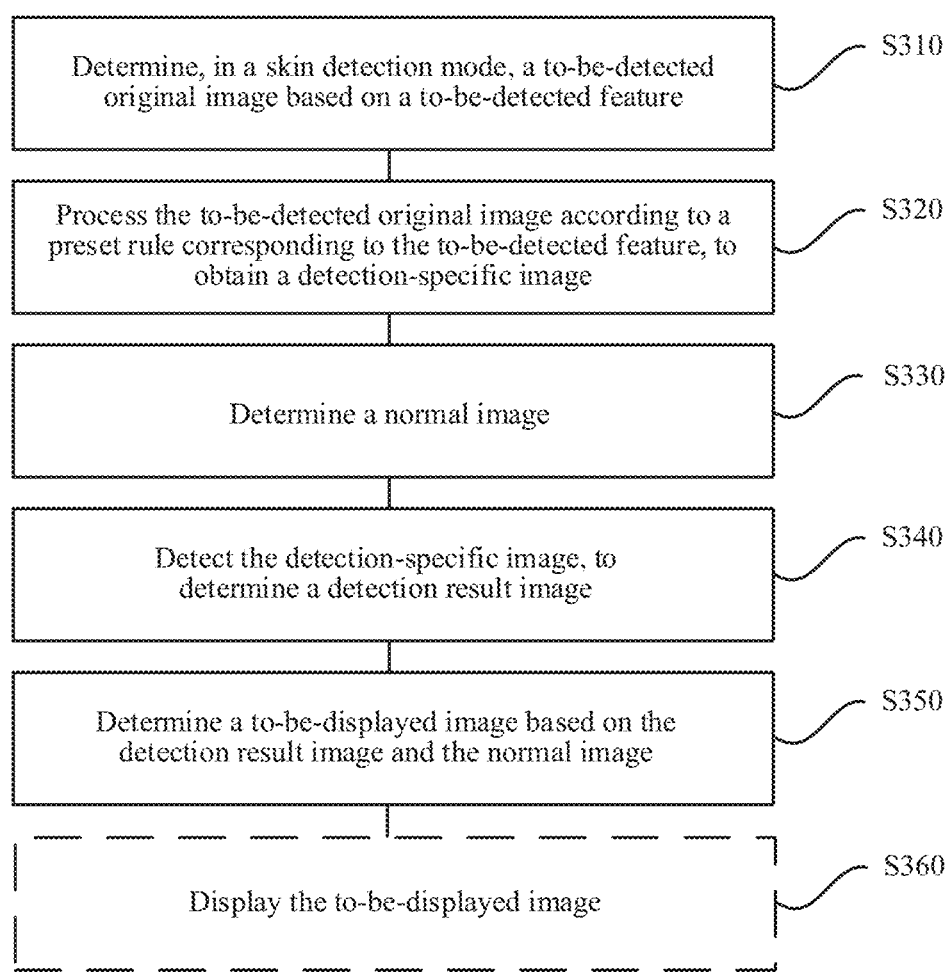
FIG. 3 is a flowchart of an image detection method according to an embodiment of the present invention.

FIG. 3 is a flowchart of an image detection method according to an embodiment of the present invention. As shown in FIG. 3, the method 300 may be used to detect a skin of an entire body. For clearer description, a facial skin is used as an example in the following method, and the method 300 may specifically include the following steps.

S310. The terminal determines, in a skin detection mode, a to-be-detected original image based on a to-be-detected feature.

Figure 4:
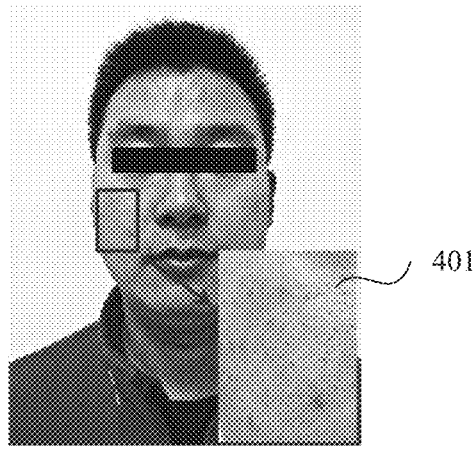
FIG. 4 (a) is a to-be-detected original image that is processed and that is in a RAW format according to an embodiment of the present invention.
Figure 4:
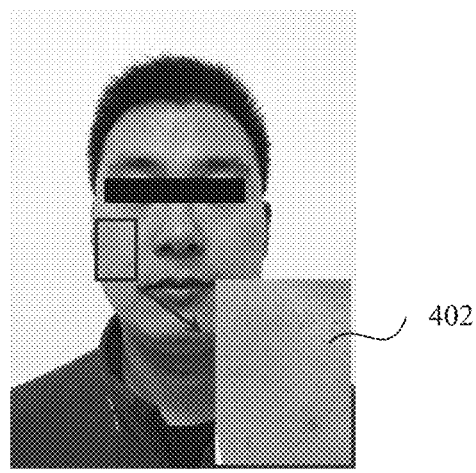

The to-be-detected original image is an image in a RAW format (namely, the foregoing image that is unprocessed and that is in the RAW format). As shown in FIG. 4 (*a*), a skin condition displayed at a location 401 is clearer. FIG. 4 (*b*) shows detection on an image in a JPEG format in the prior art, and details of the image in the JPEG format that are displayed in a part 402 is blurred. If the image obtained in the prior art is detected, a more accurate detection result cannot be obtained.

Specifically, the skin detection mode provided in this embodiment of the present invention may be a preset mode.

The skin detection mode is selected to shoot the to-be-detected original image. Alternatively, a non-skin detection mode (namely, a common shooting mode) may be used for shooting. The to-be-detected feature includes at least one of a skin color, a stain, a red zone, acne, grease, a wrinkle, an eye feature, and a pore. The preset skin detection mode may be processed by using a 3A algorithm. The 3A algorithm of the preset skin detection mode includes automatic exposure (AE), automatic white balance (AWB), and autofocus (AF). This implements a negative feedback closed-loop control system. To be specific, a status hardware module outputs a photometric value, an aperture value, or gray space, the corresponding 3A algorithm is used to provide a feedback for a corresponding processing unit for processing, until the corresponding value is stable, and then the to-be-detected original image is shot.

In an implementable embodiment, if the to-be-detected feature includes at least one of the skin color, the stain, the red zone, and the acne, the terminal uses a color camera to shoot an original image for detection in the skin detection mode, and then the terminal determines the to-be-detected original image in the original image for detection. The to-be-detected original image is a color to-be-detected original image.

If the to-be-detected feature includes at least one of the grease, the wrinkle, the eye feature, and the pore, the terminal uses a monochrome camera to shoot an original image for detection in the skin detection mode, and then the terminal determines the to-be-detected original image in the original image for detection. The to-be-detected original image is a monochrome to-be-detected original image.

Figure 5:
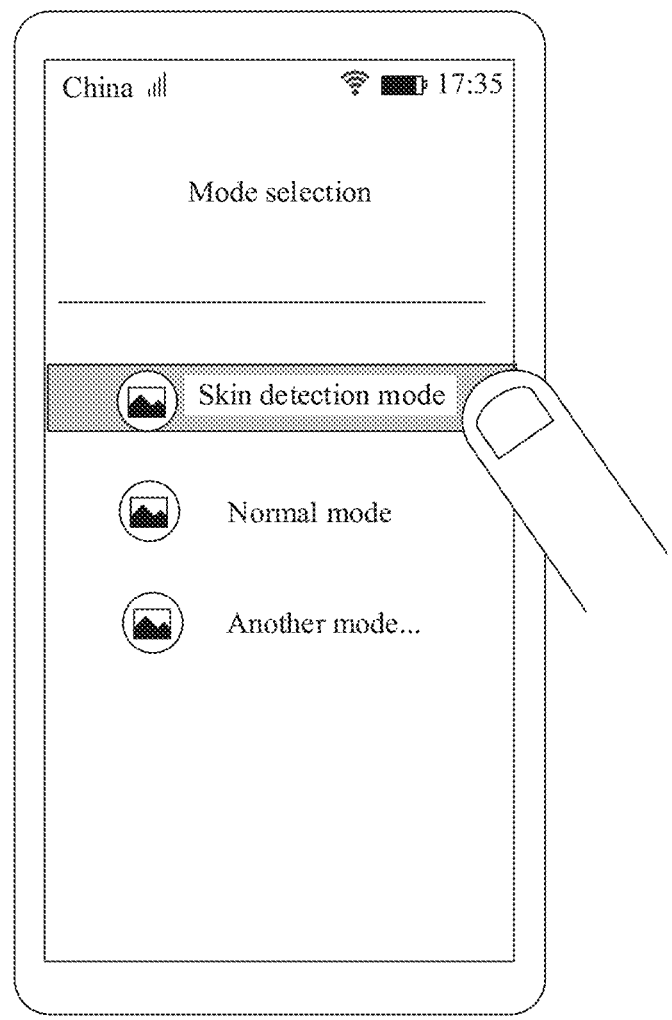
FIG. 5 (a) is a diagram of a mode selection interface according to an embodiment of the present invention.
Figure 5:
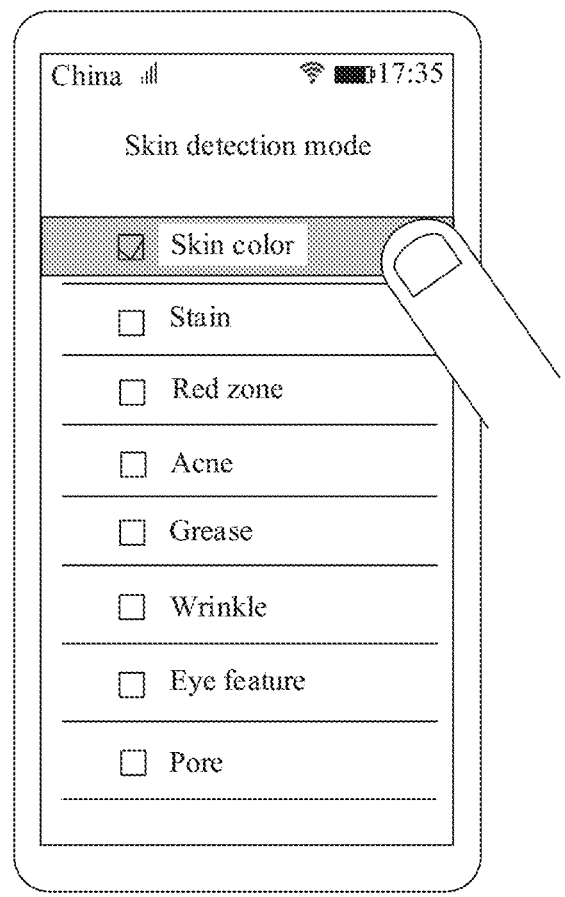
Figure 6:
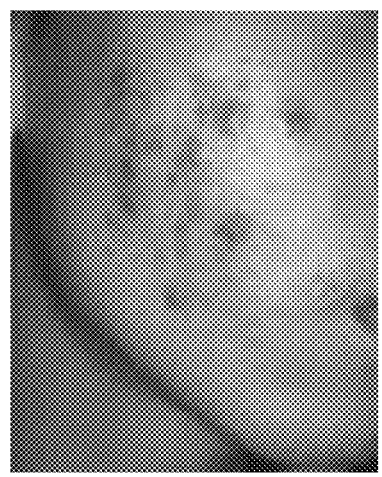
FIG. 6 (a) is a schematic diagram of a to-be-detected original image including acne according to an embodiment of the present invention.
Figure 6:

For example, as shown in FIG. 5 (a), a user selects the skin detection mode on the terminal. Mode selection in FIG. 5 (a) may include a plurality of modes, such as a common mode, the skin detection mode, and another mode. The skin detection mode may include a plurality of skin detection modes such as a first skin detection mode and a second skin detection mode. For example, a to-be-detected feature that may be included in the first skin detection mode is at least one of the skin color, the stain, the red zone, and the acne. A to-be-detected feature that may be included in the second skin detection mode is at least one of the grease, the wrinkle, the eye feature, and the pore. As shown in FIG. 5 (b), the terminal displays a detection feature option in the skin detection mode, to provide a to-be-detected feature option for the user. The terminal determines the to-be-detected feature based on selection of the user. If the user selects no detection feature, the terminal automatically detects all to-be-detected features by default. The camera of the terminal may be a dual-lens camera, and the dual-lens camera may include the color camera and the monochrome camera.

To-be-detected features may have a plurality of combinations, which respectively correspond to different skin detection modes. For example, a first combination is the skin color, the stain, the red zone, and the acne; and a second combination is the grease, the wrinkle, the eye feature, and the pore. An appropriate camera is selected based on a combination of to-be-detected features, and a to-be-detected original image (namely, an image that is unprocessed and that is in a RAW format) more suitable for the to-be-detected feature is shot by using the selected camera. The camera may be invoked in the skin detection mode. The user may freely select a shooting mode, and the user may also select a to-be-detected feature corresponding to the shooting mode. This is not limited herein. When the user selects no to-be-detected feature, the terminal automatically detects all the to-be-detected features by default. The camera determined by the terminal may be a dual-lens camera and the dual-lens camera may include the color camera and the monochrome camera.

In another implementable embodiment, if the to-be-detected feature includes at least one of the skin color, the stain, the red zone, and the acne, the terminal uses a dual-lens camera to shoot the to-be-detected original image (in other words, a color camera and a monochrome camera simultaneously perform shooting) in the skin detection mode. Then, the terminal extracts, as the to-be-detected original image, only an image that is unprocessed, that is in a RAW format, and that corresponds to the color camera.

If the to-be-detected feature includes at least one of the grease, the wrinkle, the eye feature, and the pore, the terminal uses a dual-lens camera to shoot the to-be-detected original image (in other words, the color camera and the monochrome camera simultaneously perform shooting) in the skin detection mode. Then, the terminal extracts, as the to-be-detected original image, only an image that is unprocessed, that is in a RAW format, and that corresponds to the monochrome camera.

S320. The terminal processes the to-be-detected original image according to a preset rule corresponding to the to-be-detected feature, to obtain a detection-specific image.

Specifically, a format of the detection-specific image may be a JPEG format. It should be noted that, in this step, after obtaining the to-be-detected original image, the terminal directly generates the detection-specific image after processing performed according to the preset rule corresponding to the to-be-detected feature. It may be understood as follows: The detection-specific image is directly generated after a photographing process, instead of first obtaining the to-be-detected original image, storing the to-be-detected original image, and then performing post-processing according to the preset rule corresponding to the to-be-detected feature, to generate the detection-specific image.

The preset rule includes a plurality of sub-rules. It may be understood that the terminal determines, based on the to-be-detected feature, the preset rule corresponding to the to-be-detected feature, and after processing is performed according to the preset rule corresponding to the detection feature, obtains the processed detection-specific image corresponding to the to-be-detected feature. The preset rule specifically includes the following.

A preset rule corresponding to the skin color includes at least one sub-rule in illumination equalization, white balance adjustment, and image smoothing. For example, skin noise can be reduced after processing is performed according to the preset rule corresponding to the skin color.

A preset rule corresponding to at least one of the stain and the red zone includes at least one sub-rule in contrast transfer, image sharpening, and RBX color space transformation. For example, according to the preset rule corresponding to the at least one of the stain and the red zone, a contrast and an image sharpening degree may be increased to preset values, then the stain is highlighted by using a B channel (brown channel) in RBX space, and the red zone may be highlighted by using an R channel (red channel).

A preset rule corresponding to the acne includes at least one sub-rule in contrast transfer, image sharpening, and an HSV space image. For example, FIG. 6 (a) shows a to-be-detected original image, and after processing is performed according to the preset rule corresponding to the acne, an obtained detection-specific image may be shown in FIG. 6 (b). Information such as a location and a size of the acne is more highlighted after the processing. For example, according to the preset rule corresponding to the acne, a contrast and an image sharpening degree may be increased to preset values, and then an acne feature is highlighted by using the HSV space image.

Figure 7:
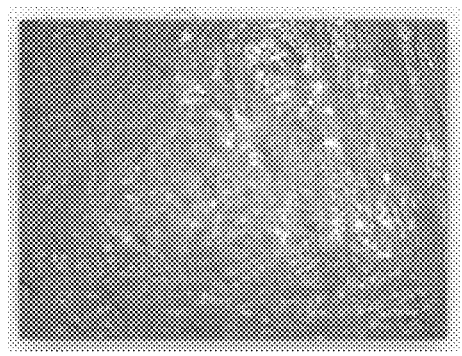
FIG. 7 (*a*) is a schematic diagram of an image including a large amount of grease according to an embodiment of the present invention.
Figure 7:

A preset rule corresponding to the grease includes contrast transfer. For example, to clearly distinguish between a skin with a large amount of grease and a normal skin, this embodiment provides images shown in FIG. 7. FIG. 7 (a) shows the skin with the large amount of grease, and a bright zone includes a large amount of grease. For example, according to the preset rule corresponding to the grease, grease detection may be completed based on a light reflection part of the skin, a contrast is increased to a preset value to further highlight the light reflection part, and the grease is detected based on the reflection part.

A preset rule corresponding to at least one of the eye feature and the pore includes at least one sub-rule in contrast transfer, illumination equalization, and image sharpening. For example, according to the preset rule corresponding to the at least one of the eye feature and the pore, a contrast and an image sharpening degree may be increased to highlight a feature region.

An adjustment amplitude of the white balance adjustment is a preset value, and transformation space of the RBX color space transformation and transformation space of the HSV space image are preset values. There may be a plurality of detection-specific images, and an image format of the detection-specific image may be a JPEG format. For example, the preset value needs to be set in advance based on a large amount of experimental data.

S330. The terminal determines a normal image.

Specifically, the normal image may be directly obtained through normal preprocessing, or may be obtained by fusing at least two sub-images of the normal image. The at least two sub-images include at least one of a color normal sub-image and a monochrome normal sub-image. A format of the normal image may be a JPEG format, and a format of the sub-image may be a JPEG format.

A step of fusing a plurality of sub-images of the normal image may include: separately performing pixel-level synchronization on the at least two sub-images, then performing alignment, extracting advantageous parts of data of the at least two images by using an image fusion algorithm, and synthesizing the advantageous parts into one image. The advantageous parts may include a color part in the color normal sub-image and a detail part of shadow in the monochrome normal sub-image.

S340. The terminal detects the detection-specific image, to determine a detection result image.

Specifically, the terminal detects at least one detection-specific image by using a skin detection algorithm, to determine at least one detection result image. Any one of a plurality of to-be-detected features corresponds to one detection-specific image, and one detection-specific image corresponds to one skin detection algorithm for detection, to determine one detection result image. The detection result image may include a mark of the to-be-detected feature. There may be a plurality of detection-specific images. The skin detection algorithm may include a plurality of sub-algorithms. The detection result image may be a plurality of images, and an image format of the detection result image may include a JPEG image. The skin detection algorithm may include the following.

If a detection-specific image corresponding to the skin color is a skin color detection-specific image, the skin color detection-specific image is detected by using a skin color detection algorithm corresponding to the skin color. The skin color detection algorithm may include: performing color calibration on the obtained skin color detection-specific image based on a preset standard image, and then comparing the skin color detection-specific image with a standard skin color number, to determine a closest skin color, so as to determine a detection result image that includes a skin color feature mark.

If a detection-specific image corresponding to at least one of the stain and the red zone is at least one of a stain detection-specific image and a red zone detection-specific image, the at least one of the stain detection-specific image and the red zone detection-specific image is detected by using at least one of a stain detection algorithm and a red zone detection algorithm that corresponds to the at least one of the stain and the red zone. The at least one of the stain detection algorithm and the red zone detection algorithm may include: for the at least one of the stain detection-specific image and the red zone detection-specific image, extracting an R channel (or a B channel) component in the foregoing RBX image, and performing image processing (for example, edge detection) on the component, to determine a detection result image that includes at least one mark of the stain and the red zone.

Figure 8:
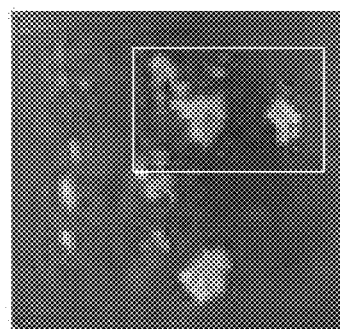
FIG. 8 is a schematic diagram of a detection result image of acne detection according to an embodiment of the present invention.

If a detection-specific image corresponding to the acne is an acne detection-specific image, the acne detection-specific image is detected by using an acne detection algorithm corresponding to the acne. The acne detection algorithm may include: performing image processing on the acne detection-specific image, namely, the HSV space image, to determine a detection result image that includes an acne mark. As shown in FIG. 8, FIG. 8 is a detection result image of acne detection. The detection result image may include a mark (a rectangular frame shown in FIG. 8 is a mark, a shape of the mark may be a plurality of shapes other than a rectangle, and this is not limited herein) of a to-be-detected feature.

If a detection-specific image corresponding to the grease is a grease detection-specific image, the grease detection-specific image is detected by using a grease detection algorithm corresponding to the grease. The grease detection algorithm may include: detecting a region with relatively high brightness in the grease detection-specific image through image processing, and calculating an area occupied by the region on a face, to determine a size of the grease, so as to determine a detection result image that includes a grease feature mark.

If a detection-specific image corresponding to at least one of the eye feature and the pore is at least one of an eye feature detection-specific image and a pore detection-specific image, the at least one of the eye feature detection-specific image and the pore detection-specific image is detected by using at least one of an eye feature detection algorithm and a pore detection algorithm that corresponds to the at least one of the eye feature and the pore, to determine a detection result image that includes at least one feature mark of the eye feature and the pore. The at least one of the eye feature detection algorithm and the pore detection algorithm may include an algorithm of an image processing type, such as edge detection or image filtering, or may be a method of a machine learning type.

S350. The terminal determines a to-be-displayed image based on the detection result image and the normal image.

Specifically, the terminal processes the at least one detection result image and the normal image by using an image matching method and an image fusion method, to obtain the to-be-displayed image.

Image matching is to identify points of a same name in the at least one detection result image and the normal image by using a matching algorithm. For example, correlation coefficients of windows with a same size in search regions and target regions of two or more images are compared during image matching, and window center points corresponding to largest correlation coefficients in the search regions are used as the points of the same name. Image fusion is to separately perform pixel-level synchronization on the at least one detection result image and the normal image, then perform alignment, extract advantageous parts from at least two pieces of image data by using an image fusion algorithm, and synthesize the advantageous parts into an image, to extract advantageous information from each channel to a greatest extent, and finally generate a high-quality image, so as to improve utilization of the image information, and increase spatial resolution and spectral resolution of an original image to facilitate detection. The image fusion process is similar to the fusion in step S330, but different original images are fused, and image fusion algorithms are used for fusion in both cases.

It should be noted that, the detection result image may be an image that includes a mark of the to-be-detected feature. To be specific, the detection result image may be understood as an image formed by extracting an image that is in the detection-specific image and that includes the to-be-detected feature, and the to-be-detected feature is marked. Details are shown in the rectangular frame in FIG. 8.

Figure 9:
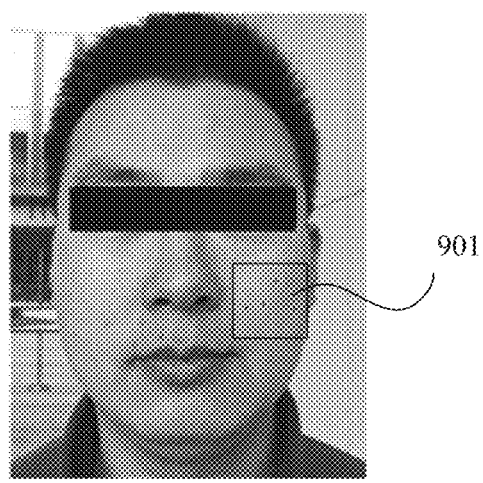
FIG. 9 is a schematic diagram of a to-be-displayed image that includes a stain according to an embodiment of the present invention.
Figure 10:
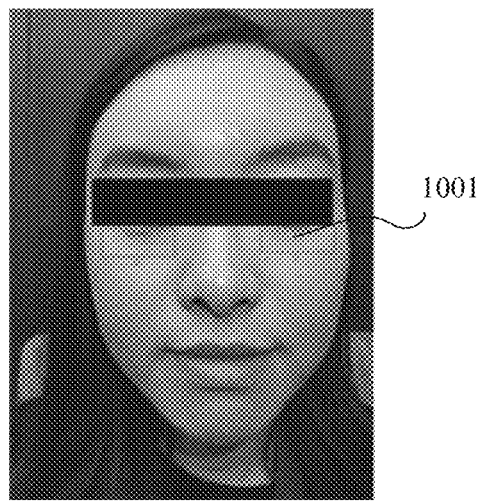
FIG. 10 is a schematic diagram of a to-be-displayed image that includes an eye feature according to an embodiment of the present invention.
Figure 11:
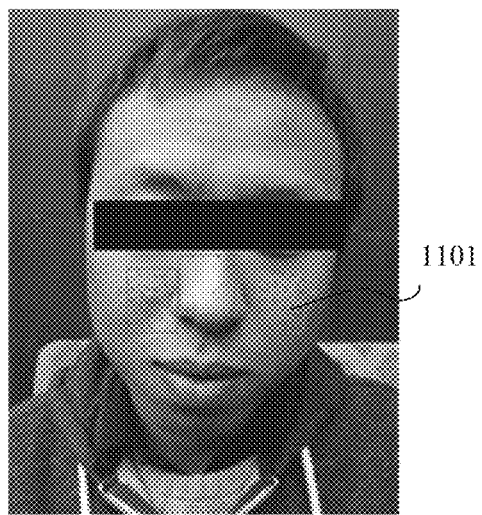
FIG. 11 is a schematic diagram of a to-be-displayed image that includes a pore according to an embodiment of the present invention.

The to-be-displayed image may be obtained after performing matching and fusion on the normal image and the image that includes the mark of the to-be-detected feature. Details are shown in FIG. 9 to FIG. 11. A region that is in the normal image and that corresponds to the detection result image is matched with the detection result image, and the detection result image is used to cover/replace the region that is in the normal image and that corresponds to the detection result image, to obtain a to-be-displayed region.

For example, the to-be-displayed image may be shower in FIG. 9. FIG. 9 may be a to-be-displayed image corresponding to a stain. 901 may display a location of the stain and a size of the stain. The location of the stain can be displayed more clearly according to a preset rule and a detection algorithm that correspond to the stain. FIG. 10 may be a to-be-displayed image of an eye feature. 1001 may display a location of the eye feature and a size of the eye feature. A problem of the eye feature may be highlighted according to a preset rule and a detection algorithm that correspond to the eye feature. FIG. 11 may be a to-be-displayed image of a pore. 1101 may display a location of the pore and a size of the pore. The location of the pore may be highlighted according to a preset rule and a detection algorithm that corresponds to the pore, to facilitate viewing by a user. In addition, an image format of the to-be-displayed image may be a JPEG image.

S360. The terminal displays the to-be-displayed image.

Specifically, content displayed by the terminal may include the to-be-displayed image, or may include the to-be-displayed image and at least one of a text description and care information that are obtained based on the to-be-displayed image.

The care information is in various forms. For example, the form of the care information may be searching a preset expert suggestion library and then obtaining a care suggestion corresponding to the detection result image; or pushing a corresponding link or the like (for example, an expert blog or a website) based on the detection result image; or selecting an online consultant to provide a face-to-face online care suggestion based on the to-be-detected result image. This is not limited in this embodiment of the present invention.

In addition to the at least one of the text description and the care information, the content displayed by the terminal may further include information such as a rank or a score in even-aged persons that is of a detection result obtained based on the detection result image. It should be noted that the rank or the score is subsequent evaluation derived based on the detection result. This is not limited in this embodiment of the present invention.

Figure 12:
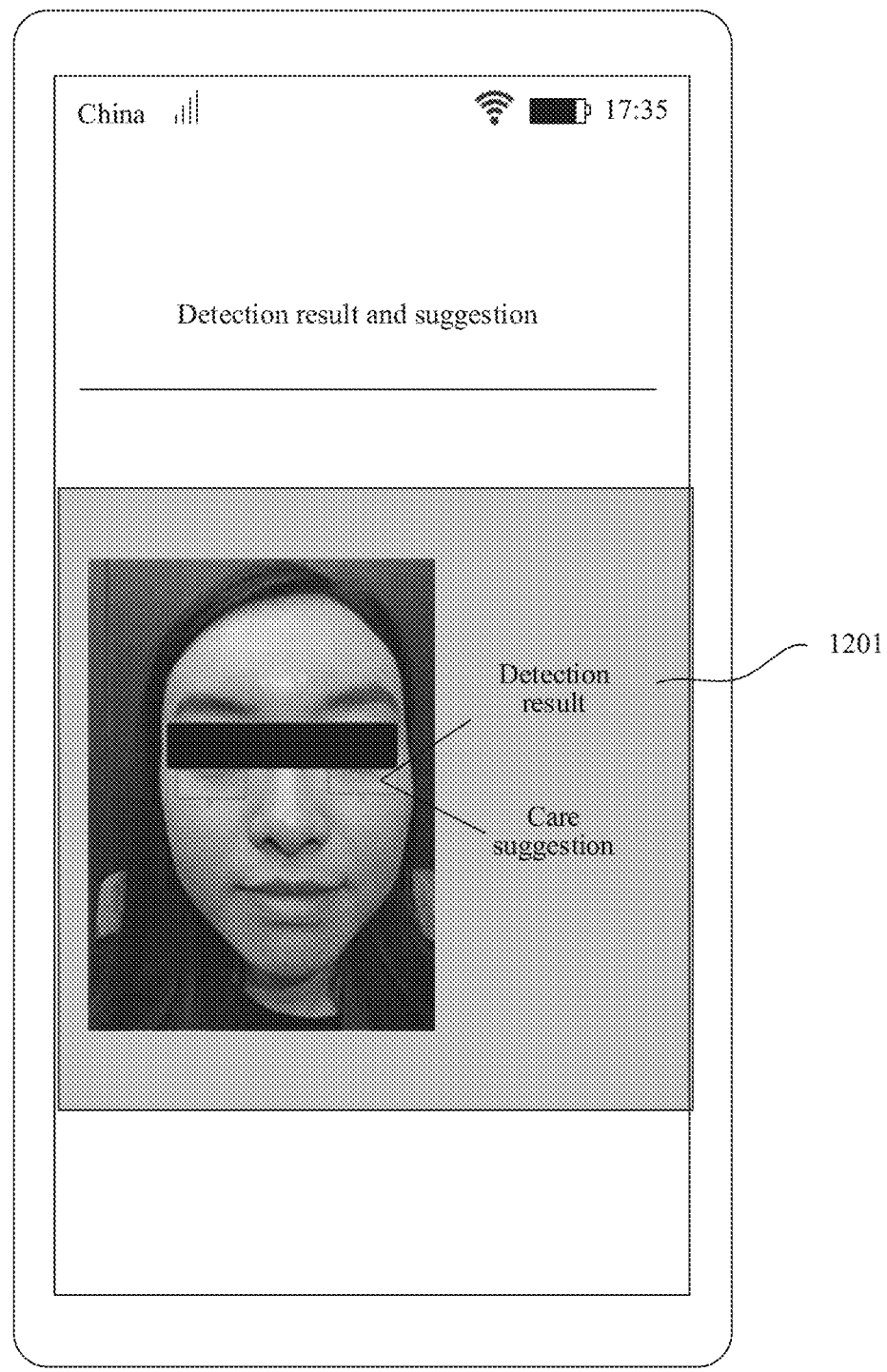
FIG. 12 is a diagram of a display interface that includes a to-be-displayed image according to an embodiment of the present invention.

For example, as shown in a display interface shown in FIG. 12, the display interface may include only a to-be-displayed image 1201, and the to-be-displayed image may include information such as a detection result image and a care suggestion. Alternatively, the display interface may include a to-be-displayed image shown in FIG. 13, the to-be-displayed image includes at least two parts: a detection result image 1301 and a suggestion 1302, and the suggestion 1302 may include information such as a detection result, a care suggestion, a rank and a score of a skin health status in even-aged persons. In this embodiment, no limitation is imposed on a displayed image, and no limitation is imposed on a suggestion part either. The suggestion part includes a suggestion part of 1201 and a suggestion part of 1302.

Figure 13:
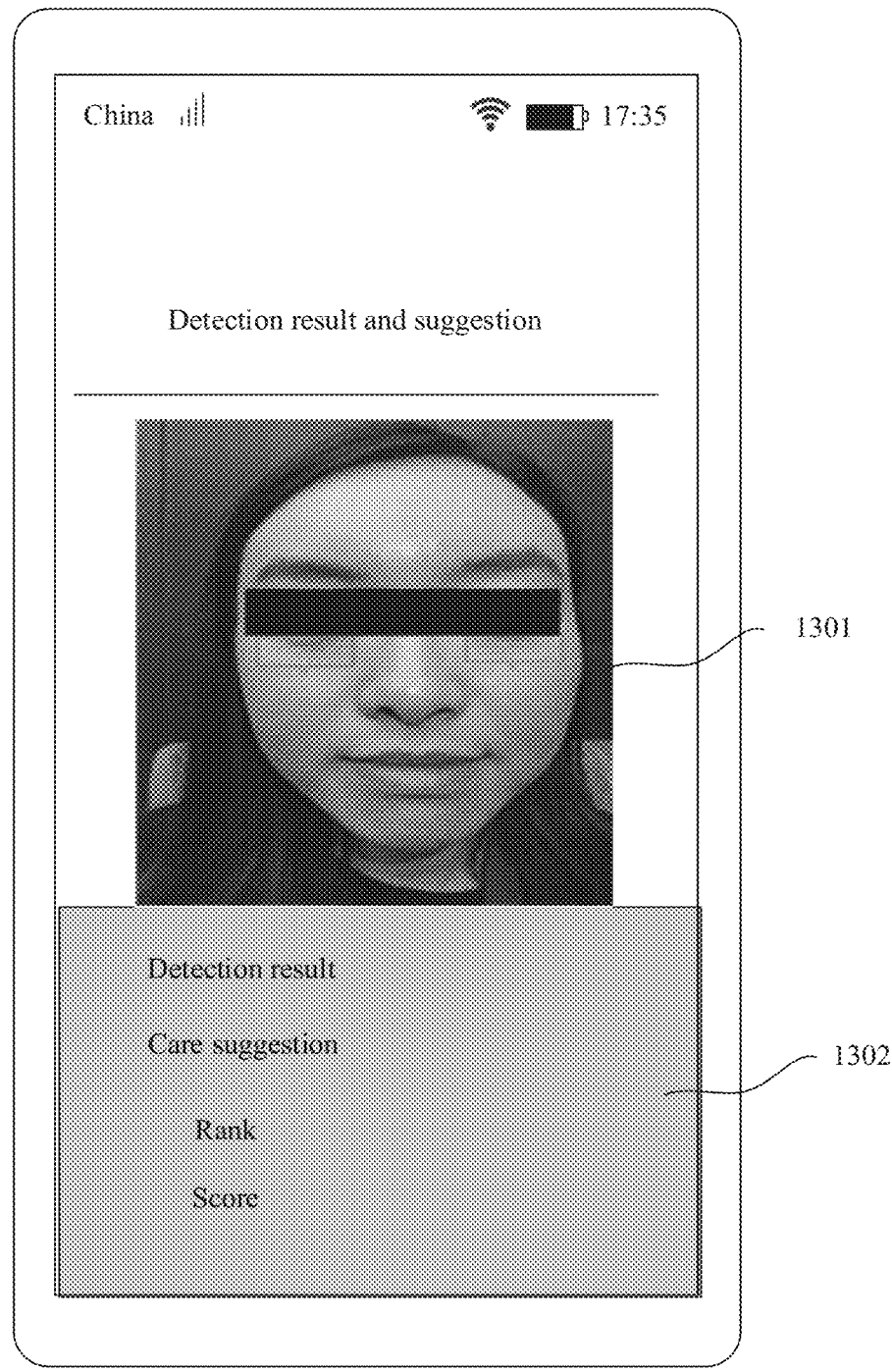
FIG. 13 is a diagram of another display interface that includes a to-be-displayed image according to an embodiment of the present invention.
Figure 14:
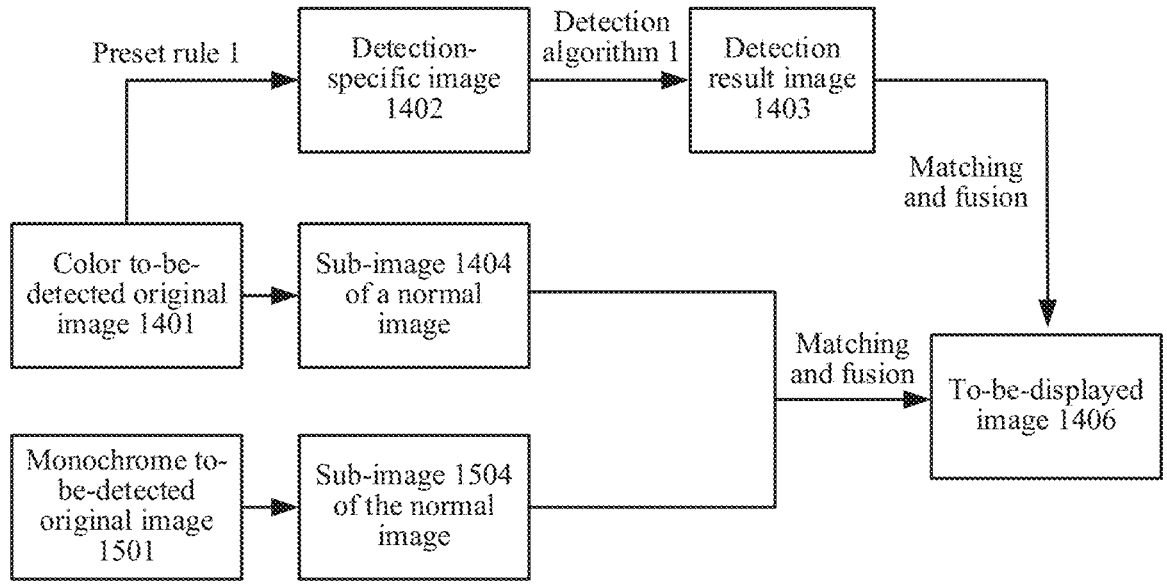
FIG. 14 is a flowchart of an image detection method according to an embodiment of the present invention.

To further understand the image detection method provided in this embodiment of the present invention, the image detection method provided in this embodiment of the present invention is described in detail with reference to FIG. 13 to FIG. 15. Details are as follows:

FIG. 14 is a flowchart of an image detection method according to an embodiment of the present invention. As shown in FIG. 14, if a user selects at least one of a skin color, a stain, a red zone, and acne, an image is detected by using the method shown in FIG. 14. Specifically, for example, after the user opens a skin health detection application, a terminal may enable a camera shooting function, to perform shooting in a skin detection mode provided by the skin health detection application. Alternatively, a camera shooting function of a terminal may be directly enabled, and then a skin detection mode is selected for shooting.

The user may select a to-be-detected feature such as the skin color in the skin health detection mode. If the terminal determines that the to-be-detected feature is the skin color, the terminal invokes a camera to perform shooting. The terminal obtains original data of an entire shot image. The camera includes a color camera and/or a monochrome camera. In addition, the terminal reads a color to-be-detected original image 1401 that is in the original data and that is in a RAW form, and processes the color to-be-detected original image 1401 according to a preset rule 1 corresponding to the skin color, to obtain a detection-specific image 1402. The preset rule 1 corresponding to the skin color may include at least one sub-rule in illumination equalization, white balance adjustment, and image smoothing. For example, skin noise can be reduced after processing is performed according to the preset rule corresponding to the skin color.

The terminal processes the detection-specific image 1402 by using a detection algorithm 1 corresponding to the skin color, to obtain a detection result image 1403. The detection algorithm 1 corresponding to the skin color may include: performing color calibration on the obtained skin color detection-specific image based on a preset standard image, then comparing the skin color detection-specific image with a standard skin color number to determine a closest skin color, and using the closest skin color obtained through comparison as a skin color mark of the detection-specific image 1402, to obtain the detection result image 1403. The detection result image 1403 includes mark information of the skin color. The mark information of the skin color may include a skin color hue and the like.

The terminal performs matching and fusion on a sub-image 1404 of a normal image and a sub-image 1504 of the normal image, and the detection result image 1403, to obtain a to-be-displayed image 1406. The sub-image 1404 of the normal image is obtained after the terminal processes the color to-be-detected original image 1401 through general preprocessing. The color to-be-detected original image 1401 may be shot by the color camera. The sub-image 1504 of the normal image is obtained after the terminal processes a monochrome detection original image 1501 through general preprocessing. The monochrome to-be-detected original image 1501 may be shot by the monochrome camera.

The terminal displays the to-be-displayed image 1406.

In the foregoing process, content displayed by the terminal may include the to-be-displayed image 1406, or may include the to-be-displayed image 1406 and at least one of a text description and care information that are obtained based on the to-be-displayed image 1406. The care information is in various forms. For example, the form of the care information may be searching a preset expert suggestion library and then obtaining a care suggestion corresponding to the detection result image; or pushing a corresponding link or the like (for example, an expert blog or a website) based on the detection result image; or selecting an online consultant to provide a face-to-face online care suggestion based on the to-be-detected result image. This is not limited in this embodiment of the present invention.

In addition to the at least one of the text description and the care information, the content displayed by the terminal may further include information such as a rank or a score in even-aged persons that is of a detection result obtained based on the detection result image. It should be noted that the rank or the score is subsequent evaluation derived based on the detection result.

Figure 15:
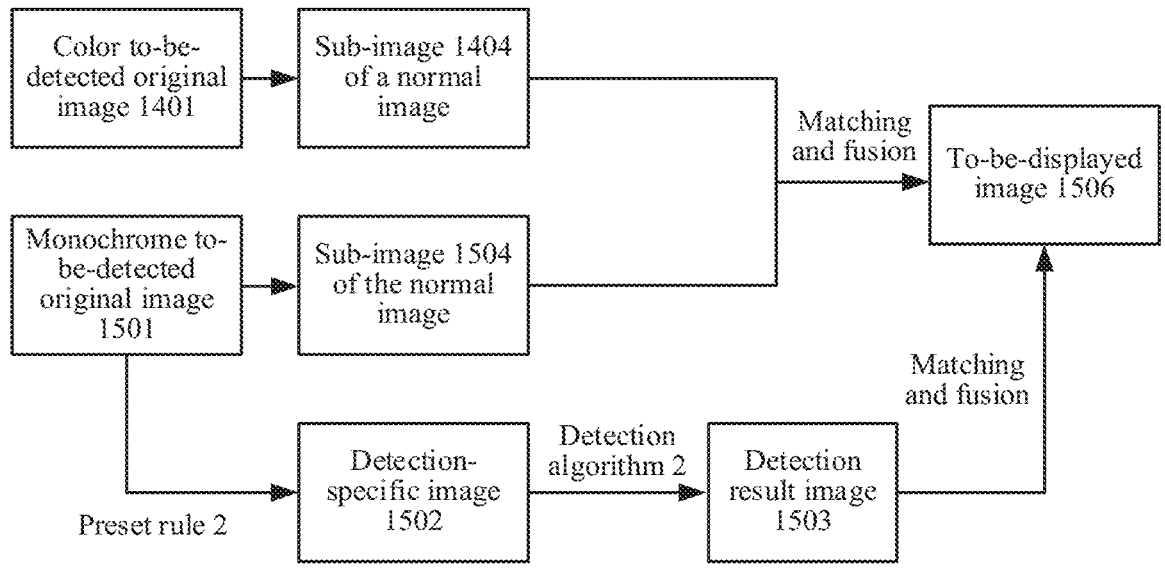
FIG. 15 is a flowchart of another image detection method according to an embodiment of the present invention.

FIG. 15 is a flowchart of another image detection method according to an embodiment of the present invention. As shown in FIG. 15, if a user selects at least one of grease, a wrinkle, an eye feature, and a pore, an image is detected by using the method shown in FIG. 15.

Specifically, for example, after the user opens a skin health detection application, a terminal may enable a camera shooting function, to perform shooting in a skin detection mode provided by the skin health detection application. Alternatively, a camera shooting function of a terminal may be directly enabled, and then a skin detection mode is selected for shooting.

The user may select a to-be-detected feature such as the grease in the skin health detection mode. If the terminal determines that the to-be-detected feature is the grease, the terminal invokes a camera to perform shooting. The terminal obtains original data of an entire shot image. The camera includes a color camera and/or a monochrome camera. In addition, the terminal reads a monochrome to-be-detected original image 1501 that is in the original data and that is in a RAW form, and processes the color to-be-detected original image 1501 according to a preset rule 2 corresponding to the grease, to obtain a detection-specific image 1502. The preset rule 2 corresponding to the grease may include contrast transfer. For example, to clearly distinguish between a skin with a large amount of grease and a normal skin, after processing is performed according to the preset rule 2 corresponding to the grease, grease detection may be completed based on a light reflection part of a skin, a contrast is increased to a preset value to further highlight the light reflection part, and the grease is detected based on the reflection part.

The terminal processes the detection-specific image 1502 by using a detection algorithm 2 corresponding to the grease, to obtain a detection result image 1503. The detection algorithm 2 corresponding to the grease may include: detecting a region with relatively high brightness in the grease detection-specific image through image processing, calculating an area occupied by the region on a face to determine an amount of grease, and using the calculated amount of grease as a grease mark of the detection-specific image 1502, to obtain the detection result image 1503. The detection result image 1503 includes mark information of the grease. The mark information of the grease may include a location of the grease on the entire face, a grease content, and the like.

The terminal performs matching and fusion on a sub-image 1504 of a normal image and a sub-image 1404 of the normal image, and the detection result image 1503, to obtain a to-be-displayed image 1506. The sub-image 1504 of the normal image is obtained after the terminal processes the monochrome to-be-detected original image 1501 through general preprocessing. The monochrome to-be-detected original image 1501 may be shot by the monochrome camera. The sub-image 1404 of the normal image is obtained after the terminal processes a color to-be-detected original image 1401 through general preprocessing. The color to-be-detected original image 1401 may be shot by the color camera.

The terminal displays the to-be-displayed image 1506.

In the foregoing process, content displayed by the terminal may include the to-be-displayed image 1506, or may include the to-be-displayed image 1506 and at least one of a text description and care information that are obtained based on the to-be-displayed image 1506. The care information is in various forms. For example, the form of the care information may be searching a preset expert suggestion library and then obtaining a care suggestion corresponding to the detection result image; or pushing a corresponding link or the like (for example, an expert blog or a website) based on the detection result image; or selecting an online consultant to provide a face-to-face online care suggestion based on the to-be-detected result image. This is not limited in this embodiment of the present invention.

In addition to the at least one of the text description and the care information, the content displayed by the terminal may further include information such as a rank or a score in even-aged persons that is of a detection result obtained based on the detection result image. It should be noted that the rank or the score is subsequent evaluation derived based on the detection result.

Figure 16:
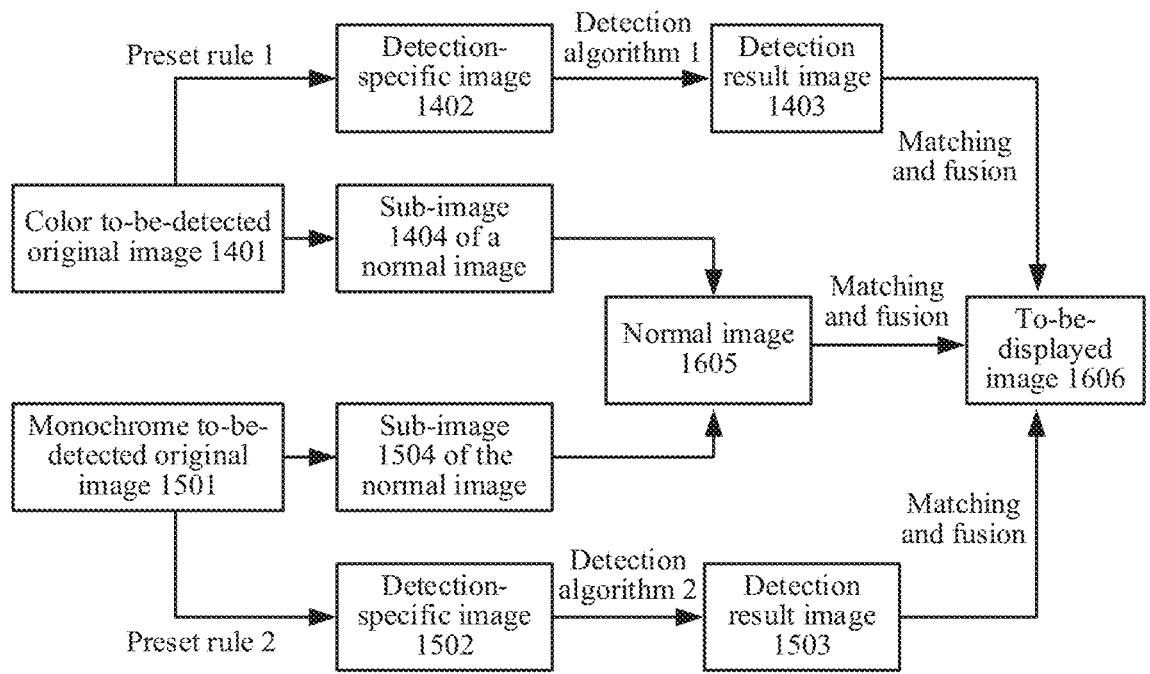
FIG. 16 is a flowchart of still another image detection method according to an embodiment of the present invention.

FIG. 16 is a flowchart of still another image detection method according to an embodiment of the present invention. As shown in FIG. 16, if a user selects at least one of a skin color, a stain, a red zone, and acne, and at least one of grease, a wrinkle, an eye feature, and a pore, an image is detected by using the method shown in FIG. 16.

For example, after the user opens a skin health detection application, a terminal may enable a camera shooting function, to perform shooting in a skin detection mode provided by the skin health detection application. Alternatively, a camera shooting function of a terminal may be directly enabled, and then a skin detection mode is selected for shooting. The user may select to-be-detected modes such as the skin color and the grease in the skin health detection mode. The terminal selects the two to-be-detected features:

the skin color and the grease in the skin detection mode. After selecting the to-be-detected features, the terminal invokes a color camera to shoot a color to-be-detected original image 1401 and invokes a monochrome camera to shoot a monochrome to-be-detected original image 1501. Image formats of the color to-be-detected original image 1401 and the monochrome to-be-detected original image 1501 may be a RAW format. In this process, the image in the RAW format is processed. A result obtained through the process is more accurate than a result obtained after a compressed image in a JPEG format is processed. In the skin detection mode, the camera shooting function may be enabled after the skin health detection application is opened. Alternatively, a camera application may be directly invoked to select the skin detection mode for shooting. The terminal processes the color to-be-detected original image according to a preset rule 1 corresponding to the skin color, to obtain a detection-specific image 1402 including the skin color. The preset rule 1 corresponding to the skin color may include at least one sub-rule in illumination equalization, white balance adjustment, and image smoothing. For example, skin noise can be reduced after processing is performed according to the preset rule corresponding to the skin color. The terminal detects, by using a detection algorithm 1 corresponding to the skin color, the detection-specific image 1402 including the skin color, to obtain a detection result image 1403 including the skin color. The detection algorithm 1 corresponding to the skin color may include: performing color calibration on the obtained skin color detection-specific image 1402 based on a preset standard image, and then comparing the skin color detection-specific image 1402 with a standard skin color number, to determine a closest skin color.

The terminal processes the color to-be-detected original image 1401 by using a common preprocessing method, to obtain a sub-image 1404 of a normal image. An image format of the sub-image 1404 of the normal image may be a JPEG format.

The terminal processes the monochrome to-be-detected original image 1501 according to a preset rule 2 corresponding to the grease, to obtain a detection-specific image 1502 including the grease. The preset rule 2 corresponding to the grease may include contrast transfer. For example, after processing is performed according to the preset rule 2 corresponding to the grease, grease detection may be completed based on a light reflection part of a skin, a contrast is increased to a preset value to further highlight the light reflection part, and the grease is detected based on the reflection part. The terminal detects, by using a detection algorithm 2 corresponding to the grease, the detection-specific image 1502 including the grease, to obtain a detection result image 1503 including the grease. The detection algorithm 2 corresponding to the grease may include: detecting a region with relatively high brightness in the grease detection-specific image 1502 through image processing, and calculating an area occupied by the region on a face, to determine an amount of the grease.

The terminal processes the monochrome to-be-detected original image 1501 by using a common preprocessing method, to obtain a sub-image 1504 of the normal image. An image format of the sub-image 1504 of the normal image may be a JPEG format.

The terminal fuses the sub-image 1404 of the normal image and the sub-image 1504 of the normal image, to obtain the normal image. The terminal performs matching and fusion on the detection result image 1401 including the skin color, the detection result image 1501 including the grease, and the normal image 1605, to obtain a to-be-displayed image 1606.

Figure 17:
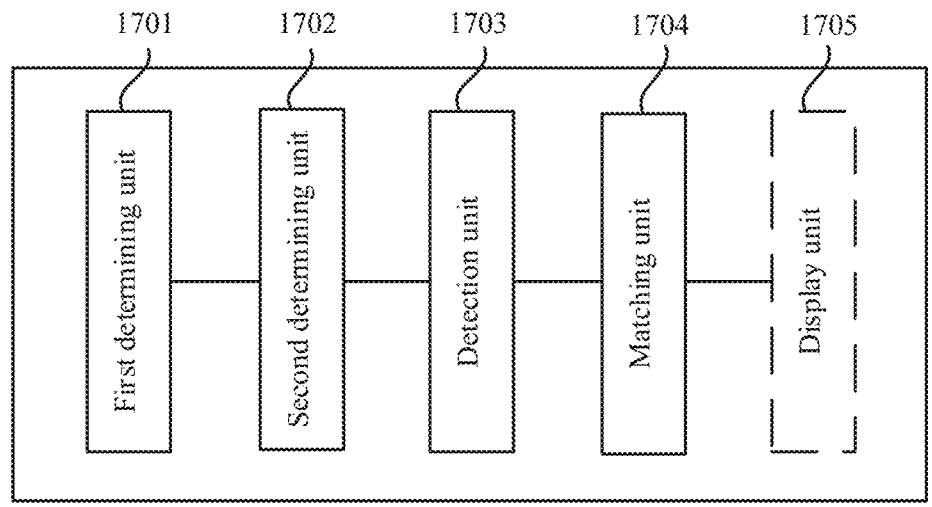
FIG. 17 is a schematic diagram of an image detection apparatus according to an embodiment of the present invention.

The terminal displays the to-be-displayed image. For specific content, refer to S360. Details are not described herein again. It should be further noted that, the displayed image may be invoked by a memory for viewing, or may be further processed after being invoked by a memory. FIG. 17 is a schematic diagram of an image detection apparatus according to an embodiment of the present invention.

As shown in FIG. 17, an embodiment of the present invention provides an image detection apparatus. The apparatus includes a first determining unit 1701 configured to determine, in a skin detection mode, a to-be-detected original image based on a to-be-detected feature, a second determining unit 1702 configured to process the to-be-detected original image according to a preset rule corresponding to the to-be-detected feature to obtain a detection-specific image, where the second determining unit 1702 is further configured to determine a normal image, a detection unit 1703 configured to detect the detection-specific image to determine a detection result image, a matching unit 1704 configured to determine a to-be-displayed image based on the detection result image and the normal image, and a display unit 1705.

The to-be-detected feature includes at least one of a skin color, a stain, a red zone, acne, grease, a wrinkle, an eye feature, and a pore. The eye feature may include at least one of under-eye puffiness, a dark under-eye circle, and an eye fine line.

The first determining unit 1701 may be further configured to determine that the to-be-detected original image includes at least one of a color to-be-detected original image and a monochrome to-be-detected original image.

Optionally, when the to-be-detected feature includes at least one of the skin color, the stain, the red zone, and the acne, the to-be-detected original image is the color to-be-detected original image; or when the to-be-detected feature includes at least one of the grease, the wrinkle, the eye feature, and the pore, the to-be-detected original image is the monochrome to-be-detected original image.

Because the to-be-detected feature has different types, in an optional implementation, different to-be-detected original images may be provided for characteristics of the types of the to-be-detected features, to provide an original image that is unprocessed and that has relatively high precision for subsequent processing. This ensures high precision of the to-be-detected original image.

The second determining unit 1702 may be configured to fuse at least two sub-images of the normal image. The at least two sub-images include at least one of a color normal sub-image and a monochrome normal sub-image. In yet another optional implementation, a preset rule corresponding to the skin color includes:

when the to-be-detected feature is a skin color, a preset rule corresponding to the skin color includes at least one sub-rule in illumination equalization, white balance adjustment, and image smoothing;

when the to-be-detected feature is at least one of a stain and a red zone, a preset rule corresponding to the at least one of the stain and the red zone includes at least one sub-rule in contrast transfer, image sharpening, and RBX color space transformation;

when the to-be-detected feature is acne, a preset rule corresponding to the acne includes at least one sub-rule in contrast transfer, image sharpening, and an HSV space image;

when the to-be-detected feature is grease, a preset rule corresponding to the grease includes contrast transfer; or when the to-be-detected feature is at least one of an eye feature and a pore, a preset rule corresponding to the at least one of the eye feature and the pore includes at least one sub-rule in contrast transfer, illumination equalization, and image sharpening.

An adjustment amplitude of the white balance adjustment is a preset value, and transformation space of the RBX color space transformation and transformation space of the HSV space image are preset values.

The matching unit 1704 is further configured to process the detection result image and the normal image by using an image matching method and an image fusion method, to determine the to-be-displayed image.

The first determining module 1701 is further configured to: display a detection feature option in the skin detection mode, and determine the to-be-detected feature based on selection of a user.

The apparatus further includes a display module, configured to display the to-be-displayed image.

The first determining unit 1701 may be further configured to: determine, the skin detection mode, the to-be-detected feature based on the to-be-detected feature; and determine, in the skin detection mode based on the to-be-detected feature, a camera that shoots the to-be-detected original image. The camera includes at least one of a color camera and a monochrome camera.

Based on different to-be-detected features, different preset rules are provided for processing. For example, skin noise can be reduced after processing is performed according to the preset rule corresponding to the skin color. After processing is performed according to the preset rule corresponding to the at least one of the stain and the red zone, a contrast and an image sharpening degree may be increased to preset values, then the stain is highlighted by using a B channel (brown channel) in RBX space, and the red zone may be highlighted by using an R channel (red channel). After processing is performed according to the preset rule corresponding to the acne, a contrast and an image sharpening degree may be increased to preset values, and then an acne feature is highlighted by using the HSV space image. After processing is performed according to the preset rule corresponding to the grease, grease detection may be completed based on a light reflection part of a skin, a contrast is increased to a preset value to further highlight the light reflection part, and the grease is detected based on the reflection part. After processing is performed according to the preset rule corresponding to the at least one of the eye feature and the pore, a contrast and an image sharpening degree may be increased to highlight a feature region.

If the to-be-detected feature includes at least one of the skin color, the stain, the red zone, and the acne, it is determined, in the skin detection mode, that the camera that shoots the to-be-detected original image is the color camera. If the to-be-detected feature includes at least one of the grease, the wrinkle, the eye feature, and the pore, it is determined, in the skin detection mode, that the camera that shoots the to-be-detected original image is the monochrome camera.

Figure 18:
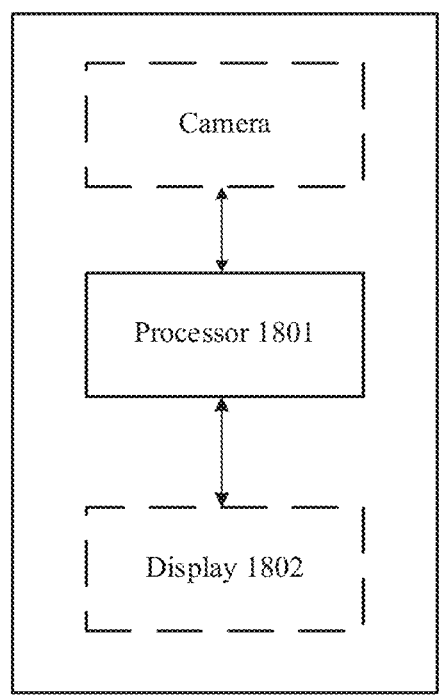
FIG. 18 is a schematic diagram of a terminal according to an embodiment of the present invention.

FIG. 18 is a schematic diagram of a terminal according to an embodiment of the present invention. As shown in FIG. 18, an embodiment of the present invention provides the terminal. The terminal includes a processor 1801, configured to determine, in a skin detection mode, a to-be-detected original image based on a to-be-detected feature. The processor is further configured to: process the to-be-detected original image according to a preset rule corresponding to the to-be-detected feature to obtain a detection-specific image, and determine a normal image. The processor is further configured to detect the detection-specific image, to determine a detection result image. The processor is further configured to determine a to-be-displayed image based on the detection result image and the normal image.

In this solution, the processor processes and detects a to-be-detected original file in the skin detection mode to obtain the detection-specific image, and the processor may further determine the detection result image based on the detection-specific image, and then processes the detection result image and the normal image, to obtain the to-be-displayed image. This resolves problems that imaging quality does not meet a requirement for detection precision of health detection, and convenient, accurate, and professional skin health detection and evaluation cannot be provided for a user anywhere and anytime.

The to-be-detected feature includes at least one of a skin color, a stain, a red zone, acne, grease, a wrinkle, an eye feature, and a pore. The eye feature may include at least one of under-eye puffiness, a dark under-eye circle, and an eye fine line.

The to-be-detected original image includes at least one of a color to-be-detected original image and a monochrome to-be-detected original image.

Specifically, when the to-be-detected feature includes at least one of the skin color, the stain, the red zone, and the acne, the to-be-detected original image is the color to-be-detected original image or when the to-be-detected feature includes at least one of the grease, the wrinkle, the eye feature, and the pore, the to-be-detected original image is the monochrome to-be-detected original image.

Because the to-be-detected feature has different types, in an optional implementation, different to-be-detected original images may be provided for characteristics of the types of the to-be-detected features, to provide an original image that is unprocessed and that has relatively high precision for subsequent processing. This ensures high precision of the to-be-detected original image.

The processor may be further configured to fuse at least two sub-images of the normal image. The at least two sub-images include at least one of a color normal sub-image and a monochrome normal sub-image. Specifically, when the to-be-detected feature is a skin color, a preset rule corresponding to the skin color includes at least one sub-rule in illumination equalization, white balance adjustment, and image smoothing;

when the to-be-detected feature is at least one of a stain and a red zone, a preset rule corresponding to the at least one of the stain and the red zone includes at least one sub-rule in contrast transfer, image sharpening, and RBX color space transformation;

when the to-be-detected feature is acne, a preset rule corresponding to the acne includes at least one sub-rule in contrast transfer, image sharpening, and an RSV space image;

when the to-be-detected feature is grease, a preset rule corresponding to the grease includes contrast transfer; or when the to-be-detected feature is at least one of an eye feature and a pore, a preset rule corresponding to the at least one of the eye feature and the pore includes at least one sub-rule in contrast transfer, illumination equalization, and image sharpening.

An adjustment amplitude of the white balance adjustment is a preset value, and transformation space of the RBX color space transformation and transformation space of the HSV space image are preset values.

The processor may be configured to process the detection result image and the normal image by using an image matching method and an image fusion method, to determine the to-be-displayed image.

The processor may be configured to: display a detection feature option in the skin detection mode, and determine the to-be-detected feature based on selection of a user.

The terminal further includes a display, configured to display the to-be-displayed image.

In addition, the processor may be further configured to: determine the to-be-detected feature in the skin detection mode; and determine, in the skin detection mode based on the to-be-detected feature, a camera that shoots the to-be-detected original image. The camera includes at least one of a color camera and a monochrome camera.

Based on different to-be-detected features, different preset rules are provided for processing. For example, skin noise can be reduced after processing is performed according to the preset rule corresponding to the skin color. After processing is performed according to the preset rule corresponding to the at least one of the stain and the red zone, a contrast and an image sharpening degree may be increased to preset values, then the stain is highlighted by using a B channel (brown channel) in RBX space, and the red zone may be highlighted by using an R channel (red channel). After processing is performed according to the preset rule corresponding to the acne, a contrast and an image sharpening degree may be increased to preset values, and then an acne feature is highlighted by using the HSV space image. After processing is performed according to the preset rule corresponding to the grease, grease detection may be completed based on a light reflection part of a skin, a contrast is increased to a preset value to further highlight the light reflection part, and the grease is detected based on the reflection part. After processing is performed according to the preset rule corresponding to the at least one of the eye feature and the pore, a contrast and an image sharpening degree may be increased to highlight a feature region.

Specifically, if the to-be-detected feature includes at least one of the skin color, the stain, the red zone, and the acne, the processor determines, in the skin detection mode, that the camera that shoots the to-be-detected original image is the color camera; or if the to-be-detected feature includes at least one of the grease, the wrinkle, the eye feature, and the pore, the processor determines, in the skin detection mode, that the camera that shoots the to-be-detected original image is the monochrome camera.

In another possible implementation, the processor may include an image signal processor and a central processing unit.

The image signal processor is configured to: determine, in the skin detection mode, the to-be-detected original image based on the to-be-detected feature; process the to-be-detected original image according to the preset rule corresponding to the to-be-detected feature, to obtain the detection-specific image; and determine the normal image.

The central processing unit is configured to: detect the detection-specific image, to determine the detection result image; and determine the to-be-displayed image based on the detection result image and the normal image.

It should be noted that a preferred solution of this solution includes that the processor is the preferred image signal processor. All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The objectives, technical solutions, and beneficial effects of this application are further described in detail in the foregoing specific embodiments. It should be understood that the foregoing descriptions are merely specific embodiments of this application, but are not intended to limit the protection scope of this application. Any modification, equivalent replacement, improvement, or the like made based on the technical solutions of this application shall fall within the protection scope of this application.

What is claimed is:

1. A method implemented by a terminal with a dual-lens camera, comprising:
    obtaining a color to-be-detected original image from a first lens of the dual-lens camera and a monochrome to-be-detected original image from a second lens of the dual-lens camera;
    determining, in a skin detection mode, a to-be-detected original image that is in a raw format based on a to-be-detected feature, wherein the to-be-detected original image comprises the color to-be-detected original image from the first lens and the monochrome to-be-detected original image from the second lens;
    processing the to-be-detected original image according to a preset rule corresponding to the to-be-detected feature to obtain a detection-specific image;
    determining a normal image that is in a Joint Photographic Experts Group (JPEG) format by:
        performing pixel-level synchronization on the color to-be-detected original image from the first lens and on the monochrome to-be-detected original image from the second lens; and
        synthesizing a first part of the color to-be-detected original image from the first lens and a second part of the monochrome to-be-detected original image from the second lens;
    detecting the detection-specific image to determine a detection result image; and
    determining a to-be-displayed image based on the detection result image and the normal image.

2. The method of claim 1, wherein the to-be-detected feature comprises a skin color, a stain, a red zone, acne, grease, a wrinkle, an eye feature, or a pore, and wherein the eye feature comprises under-eye puffiness, a dark under-eye circle, or an eye fine line.

3. The method of claim 2, further comprising:
identifying that the to-be-detected feature comprises the skin color, the stain, the red zone, or the acne; and
determining, in response to the identifying, that the to-be-detected original image is the color to-be-detected original image.

4. The method of claim 2, further comprising:
identifying that the to-be-detected feature comprises the grease, the wrinkle, the eye feature, or the pore; and
determining, in response to the identifying, that the to-be-detected original image is the monochrome to-be-detected original image.

5. The method of claim 1, further comprising processing the detection result image and the normal image, using an image matching method and an image fusion method, to determine the to-be-displayed image.

6. The method of claim 1, further comprising:
displaying a detection feature option in the skin detection mode; and
determining the to-be-detected feature based on selection of a user.

7. The method of claim 1, further comprising displaying the to-be-displayed image.

8. An electronic device, comprising:
a dual-lens camera;
a non-transitory memory comprising instructions; and
a processor coupled to the dual-lens camera and the non-transitory memory, wherein the instructions when executed by the processor, cause the electronic device to:
obtain a color to-be-detected original image from a first lens of the dual-lens camera and a monochrome to-be-detected original image from a second lens of the dual-lens camera;
determine, in a skin detection mode, a to-be-detected original image that is in a raw format based on a to-be-detected feature, wherein the to-be-detected original image comprises the color to-be-detected original image from the first lens and the monochrome to-be-detected original image from the second lens;
process the to-be-detected original image according to a preset rule corresponding to the to-be-detected feature to obtain a detection-specific image;
determine a normal image that is in a Joint Photographic Experts Group (JPEG) format by:
performing pixel-level synchronization on the color to-be-detected original image from the first lens and on the monochrome to-be-detected original image from the second lens; and
synthesizing a first part of the color to-be-detected original image from the first lens and a second part of the monochrome to-be-detected original image from the second lens;
detect the detection-specific image to determine a detection result image; and
determine a to-be-displayed image based on the detection result image and the normal image.

9. The electronic device of claim 8, wherein the to-be-detected feature comprises a skin color, a stain, a red zone, acne, grease, a wrinkle, an eye feature, or a pore, and wherein the eye feature comprises under-eye puffiness, a dark under-eye circle, or an eye fine line.

10. The electronic device of claim 9, wherein the instructions further cause the electronic device to:
identify that the to-be-detected feature comprises the skin color, the stain, the red zone or the acne; and
determine, in response to the identifying, the to-be-detected original image is the color to-be-detected original image.

11. The electronic device of claim 9, wherein the instructions further cause the electronic device to:
identify that the to-be-detected feature comprises the grease, the wrinkle, the eye feature or the pore; and
determine, in response to the identifying, that the to-be-detected original image is the monochrome to-be-detected original image.

12. The electronic device of claim 8, wherein the instructions further cause the electronic device to process the detection result image and the normal image, using an image matching method and an image fusion method, to determine the to-be-displayed image.

13. The electronic device of claim 8, wherein the instructions further cause the electronic device to:
display a detection feature option in the skin detection mode; and
determine the to-be-detected feature based on selection of a user.

14. The electronic device of claim 8, wherein the instructions further cause the electronic device to display the to-be-displayed image.

15. A computer program product comprising computer-executable instructions stored on a non-transitory computer-readable medium that, when executed by a processor, cause an apparatus to:
obtain a color to-be-detected original image from a first lens of a dual-lens camera and a monochrome to-be-detected original image from a second lens of the dual-lens camera;
determine, in a skin detection mode, a to-be-detected original image that is in a raw format based on a to-be-detected feature, wherein the to-be-detected original image comprises the color to-be-detected original image from the first lens and the monochrome to-be-detected original image from the second lens;
process the to-be-detected original image according to a preset rule corresponding to the to-be-detected feature to obtain a detection-specific image;
determine a normal image that is in a Joint Photographic Experts Group (JPEG) format by:
performing pixel-level synchronization on the color to-be-detected original image from the first lens and on the monochrome to-be-detected original image from the second lens; and
synthesizing a first part of the color to-be-detected original image from the first lens and a second part of the monochrome to-be-detected original image from the second lens;
detect the detection-specific image to determine a detection result image; and
determine a to-be-displayed image based on the detection result image and the normal image.

16. The computer program product of claim 15, wherein the computer-executable instructions further cause the apparatus to process the detection result image and the normal image, using an image matching method and an image fusion method, to determine the to-be-displayed image.

17. The computer program product of claim 15, wherein the computer-executable instructions further cause the apparatus to:

display a detection feature option in the skin detection mode; and determine the to-be-detected feature based on selection of a user.

18. The computer program product of claim 15, wherein the computer-executable instructions further cause the apparatus to display the to-be-displayed image.

19. The method of claim 1, wherein the raw format comprises 10-bit to 16-bit color information, and wherein the JPEG format comprises 8-bit color information.

20. The electronic device of claim 8, wherein the raw format comprises 10-bit to 16-bit color information, and wherein the JPEG format comprises 8-bit color information.

* * * * *